(12) United States Patent
Wade et al.

(10) Patent No.: US 11,676,200 B2
(45) Date of Patent: Jun. 13, 2023

(54) SYSTEMS AND METHODS FOR GENERATING AUGMENTED REALITY SCENES FOR PHYSICAL ITEMS

(71) Applicant: SHOPIFY INC., Ottawa (CA)

(72) Inventors: Jonathan Wade, Ottawa (CA); Juho Mikko Haapoja, Toronto (CA); Byron Leonel Delgado, Ottawa (CA); Daniel Beauchamp, Toronto (CA)

(73) Assignee: SHOPIFY INC., Ottawa (CA)

( * ) Notice: Subject to any disclaimer, the term of this patent is extended or adjusted under 35 U.S.C. 154(b) by 181 days.

(21) Appl. No.: 16/783,322

(22) Filed: Feb. 6, 2020

(65) Prior Publication Data

US 2021/0248669 A1    Aug. 12, 2021

(51) Int. Cl.
  *G06T 19/00* (2011.01)
  *G06Q 30/0601* (2023.01)
  *G06N 20/00* (2019.01)
  *G06F 3/01* (2006.01)
  *G06F 3/16* (2006.01)
  *G06V 20/20* (2022.01)

(52) U.S. Cl.
  CPC ......... *G06Q 30/0643* (2013.01); *G06F 3/016* (2013.01); *G06F 3/167* (2013.01); *G06N 20/00* (2019.01); *G06Q 30/0623* (2013.01); *G06T 19/006* (2013.01); *G06V 20/20* (2022.01)

(58) Field of Classification Search
  CPC ..... G06T 19/006; G06F 3/0486; G06F 3/016; G06F 3/167; G06Q 30/0643; G06Q 30/0623; G06N 20/00
  See application file for complete search history.

(56) References Cited

U.S. PATENT DOCUMENTS

| 2002/0010734 A1* | 1/2002 | Ebersole | H04L 67/12 |
| | | | 709/201 |
| 2008/0071559 A1* | 3/2008 | Arrasvuori | G06T 19/006 |
| | | | 705/26.1 |
| 2012/0120113 A1 | 5/2012 | Hueso | |
| 2013/0222393 A1* | 8/2013 | Merrell | G06T 19/00 |
| | | | 345/441 |

(Continued)

FOREIGN PATENT DOCUMENTS

WO    2013063299 A1    5/2013

OTHER PUBLICATIONS

Szeliski, Richard, "Computer Vision: Algorithms and Applications (Chapter 4: Feature detection and matching)", Sep. 3, 2010, pp. 205-266.

(Continued)

*Primary Examiner* — Nhat Huy T Nguyen

(57) ABSTRACT

Systems and methods are provided for the generation of augmented reality (AR) scenery for a physical item. The AR scenery allows a customer to interact with the physical item in the real-world, while also allowing the customer to view the physical item in a virtual setting that may be tailored to the customer and/or to the physical item. According to an embodiment, an AR scene is generated for a physical item. The AR scene includes computer-generated scenery and at least a portion of an image of the physical item, where the computer-generated scenery is based on information associated with the user and/or the physical item. The AR scene is then displayed on a device.

24 Claims, 20 Drawing Sheets

(56) References Cited

U.S. PATENT DOCUMENTS

| | | | |
|---|---|---|---|
| 2013/0293530 A1* | 11/2013 | Perez ..................... | G06F 3/012 |
| | | | 345/418 |
| 2014/0278274 A1* | 9/2014 | Osher ..................... | G06F 30/13 |
| | | | 703/1 |
| 2017/0262154 A1* | 9/2017 | Black ................. | G02B 27/0093 |
| 2020/0111261 A1* | 4/2020 | Fang .................... | G06V 10/235 |
| 2020/0175576 A1* | 6/2020 | Born ..................... | G06Q 50/16 |

OTHER PUBLICATIONS

European Search Report issued on EP Patent Application No. 20215725.1, dated May 28, 2021, 9 pages.
Communication Pursuant to Rule 114(2) EPC issued on European Patent Application No. 20215725.1, dated Jun. 7, 2022. 8 pages.

* cited by examiner

FIG. 2

E-Commerce Platform | Search | JG John's Apparel / Jonny B. Good

- Home
- Orders
- Products
- Customers
- Reports
- Discounts
- Apps

SALES CHANNELS ⊕
- Online Store
- Mobile App

View all channels

⚙ Settings

Good afternoon, Jonny B..
Here's what's happening with your store today.

Today's total sales   Today's visits
$98.00                1

- Update your Platform Payments tax details
  We require additional information to verify your identity.
  [Update tax details]

- Advanced Cash on Delivery has been deactivated for your store
  [See why]

All channels ⌄ | Today ⌄

TOTAL SALES
$98.00

$125
$75
$25
        12am    8pm    4pm    11pm
                              Jun 1
                              2 orders TOTAL SALES BY CHANNEL    View dashboard Online Store                           Jun 1
$0.00                                  0 orders Mobile app
$0.00                                  0 orders Shopify POS (126 York St.)
$0.00                                  0 orders

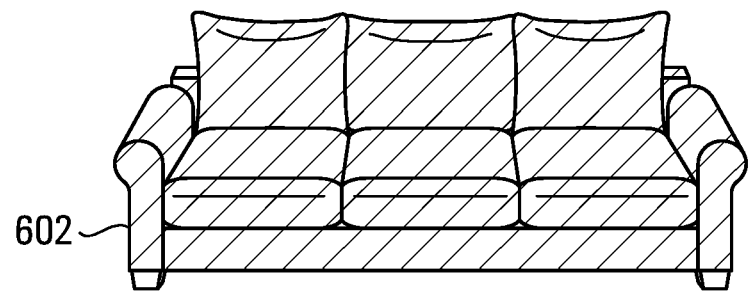
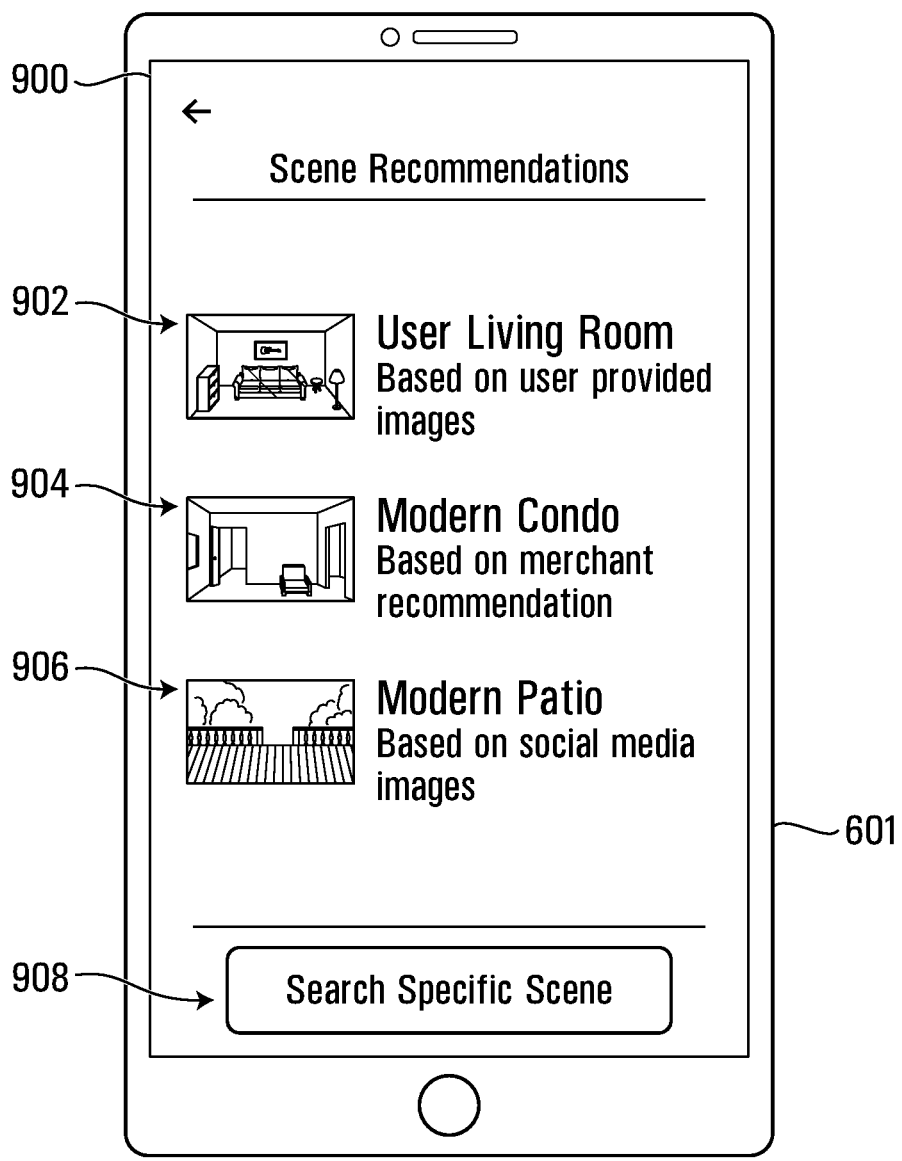
FIG. 9

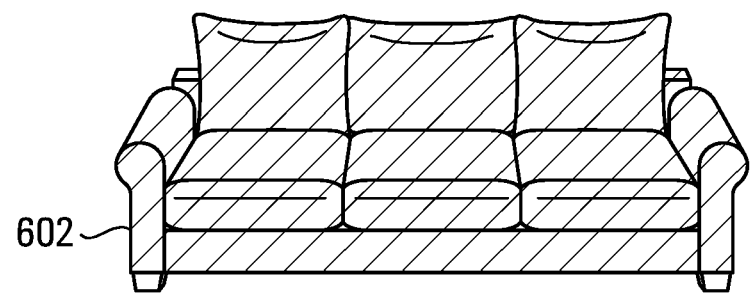
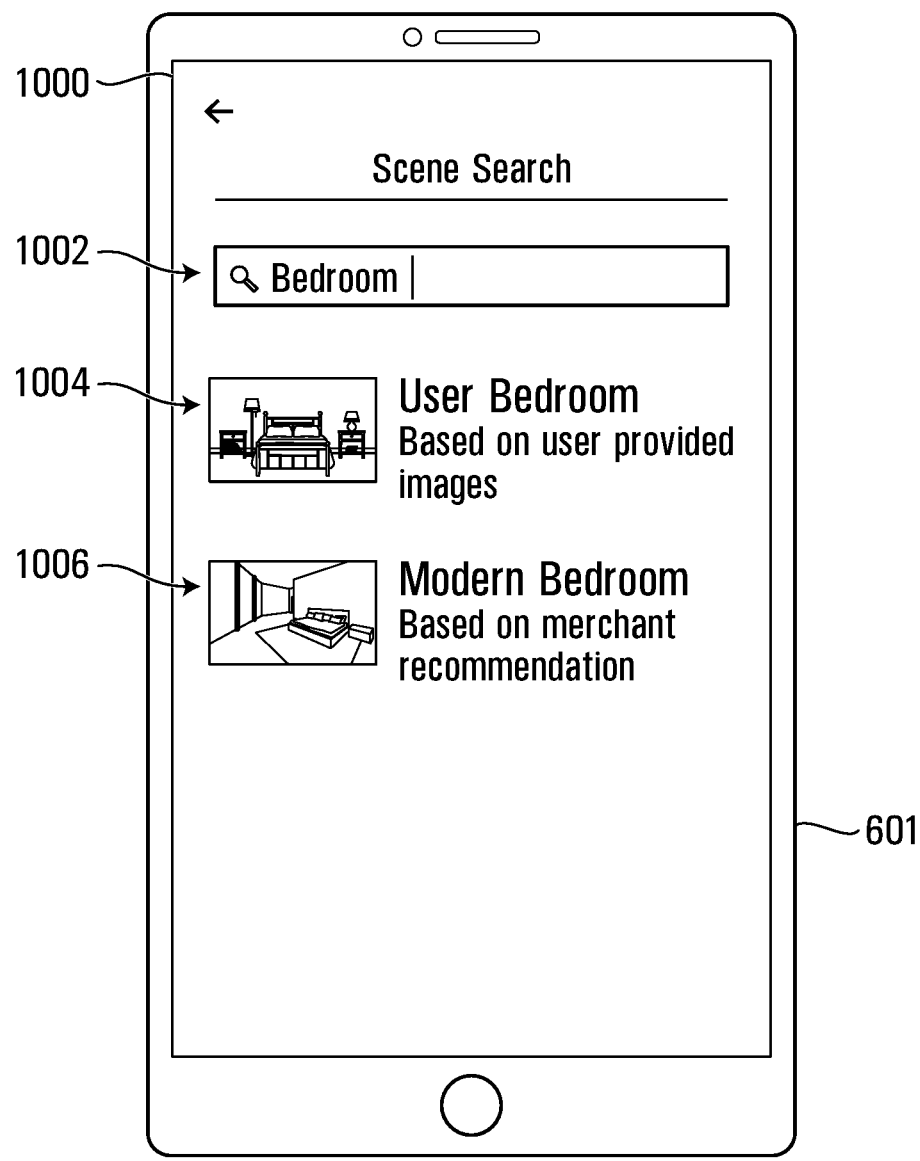
FIG. 10

US 11,676,200 B2

SYSTEMS AND METHODS FOR GENERATING AUGMENTED REALITY SCENES FOR PHYSICAL ITEMS

FIELD

The present application relates to augmented reality (AR), and in particular embodiments, to the generation of AR content.

BACKGROUND

AR relates to the enhancement of real-world experiences using computer-generated or virtual content. In some cases, AR involves superposing physical real-world content with computer-generated content. This superposition can be either constructive or destructive. Constructive AR adds content to a real-world experience, whereas destructive AR masks content in a real-world experience. AR differs from virtual reality (VR). VR relates to the creation of a completely computer-generated experience, whereas AR maintains at least a portion of the real-world experience, but alters the perception of that real-world experience using computer-generated content.

SUMMARY

Some embodiments of the present disclosure relate to the generation of AR scenery for a physical item. The AR scenery allows a user (for example, a customer) to view the physical item in a specific environment or setting that may be tailored to the user and/or the physical item, while also allowing the user to interact with the physical item in the real-world.

According to an aspect of the present disclosure, there is provided a computer-implemented method. The method includes: obtaining an image of a physical item, the image having been captured by a device associated with a user; obtaining information associated with at least one of the user and the physical item; generating an AR scene including computer-generated scenery and at least a portion of the image, the computer-generated scenery being based on the information; and instructing the device to display the AR scene.

In some embodiments, obtaining the information includes obtaining a three-dimensional (3D) model associated with at least one of the user and the physical item. The computer-generated scenery is based on the 3D model.

In some embodiments, obtaining the information includes obtaining a plurality of 3D models associated with at least one of the user and the physical item, the plurality of 3D models including the 3D model. In these embodiments the method further includes receiving a selection of the 3D model from the plurality of 3D models.

In some embodiments, the method further includes determining a product that corresponds to the physical item, where the information is associated with at least one of the user and the product.

In some embodiments, the product is a first product, and obtaining the information includes obtaining an indication of a second product associated with at least one of the user and the first product. In these embodiments the computer-generated scenery includes a virtual representation of the second product.

In some embodiments, determining the product that corresponds to the physical item includes receiving an indication of the product.

In some embodiments, determining the product that corresponds to the physical item includes analysing the image.

In some embodiments, generating the AR scene includes: determining the dimensions of the physical item, and scaling the computer-generated scenery relative to the dimensions of the physical item.

In some embodiments, generating the AR scene includes anchoring the portion of the image to a virtual point in the computer-generated scenery.

In some embodiments, the method further includes: receiving a request to modify the AR scene; generating a modified AR scene based on the request; and instructing the device to display the modified AR scene.

In some embodiments, the image is a first image, the physical item is a first physical item, the device is a first device and the user is a first user. The method further includes: obtaining a second image of a second physical item, the second image having been captured by a second device associated with a second user, where the AR scene further includes a virtual representation of the second physical item.

In some embodiments, obtaining the information includes obtaining the information using a machine learning model.

In some embodiments, generating the AR scene includes generating visual content and one or more of audio content and haptic content.

According to another aspect of the present disclosure, there is provided a system including a memory to store information and one or more processors to perform any method as disclosed herein.

BRIEF DESCRIPTION OF THE DRAWINGS

Embodiments will be described, by way of example only, with reference to the accompanying figures wherein:

FIG. 2 is an example of a home page of an administrator, according to an embodiment;

FIG. 9 is a diagram illustrating a selection of a recommended scene for the couch shown in FIG. 6, according to an embodiment;

FIG. 10 is a diagram illustrating a search for a specific scene for the couch shown in FIG. 6, according to an embodiment;

DETAILED DESCRIPTION

For illustrative purposes, specific example embodiments will now be explained in greater detail below in conjunction with the figures.

Example e-Commerce Platform

In some embodiments, the methods disclosed herein may be performed on or in association with a commerce platform such as an e-commerce platform. Therefore, an example of a commerce platform will be described.

Figure 1:
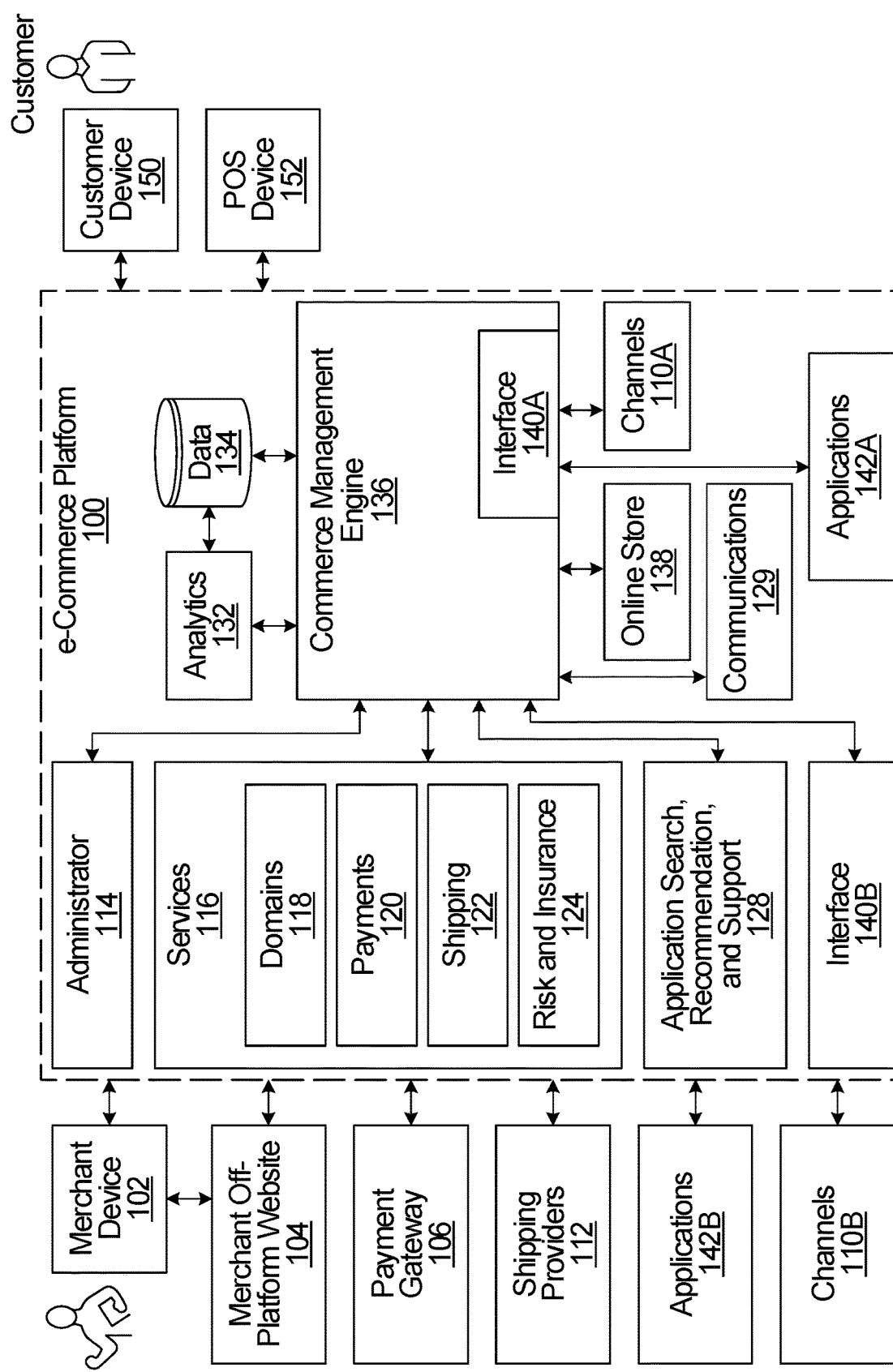
FIG. 1 is a block diagram of an e-commerce platform, according to an embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementation of Augmented Reality in an e-Commerce Platform

Figure 3:
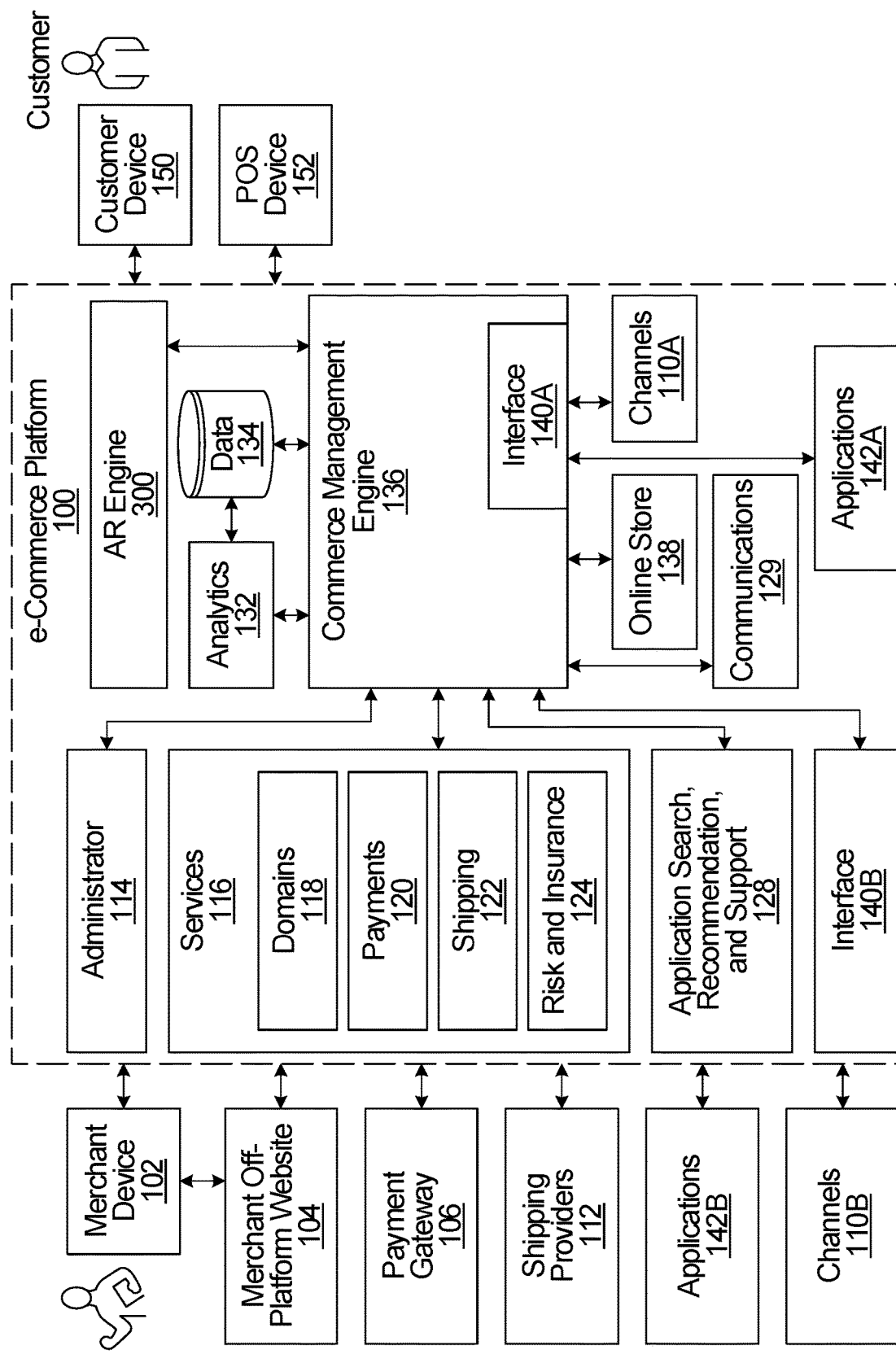
FIG. 3 illustrates the e-commerce platform of FIG. 1, but including an AR engine.

Augmented reality (AR) may be used in commerce to provide improved customer or buyer experiences. The e-commerce platform 100 could implement AR for any of a variety of different applications, examples of which are described elsewhere herein. FIG. 3 illustrates the e-commerce platform 100 of FIG. 1, but including an AR engine 300. The AR engine 300 is an example of a computer-implemented system that generates AR content for use by the e-commerce platform 100, the customer device 150 and/or the merchant device 102.

Although the AR engine 300 is illustrated as a distinct component of the e-commerce platform 100 in FIG. 3, this is only an example. An AR engine could also or instead be provided by another component residing within or external to the e-commerce platform 100. In some embodiments, either or both of the applications 142A-B provide an AR engine that is available to customers and/or to merchants. Furthermore, in some embodiments, the commerce management engine 136 provides an AR engine. The e-commerce platform 100 could include multiple AR engines that are provided by one or more parties. The multiple AR engines could be implemented in the same way, in similar ways and/or in distinct ways. In addition, at least a portion of an AR engine could be implemented in the merchant device 102 and/or in the customer device 150. For example, the customer device 150 could store and run an AR engine locally as a software application.

As discussed in further detail below, the AR engine 300 could implement at least some of the functionality described herein. Although the embodiments described below may be implemented in association with an e-commerce platform, such as (but not limited to) the e-commerce platform 100, the embodiments described below are not limited to e-commerce platforms.

Applications of AR in Commerce

AR can be used to create computer-generated representations of products for commercial applications. A computer-generated representation of a product can be superimposed with a real-world image captured by a customer device. For example, the computer-generated representation of the product may be superimposed with an image of a real-world location, which allows the customer to view the product in an environment that is of interest to them. In some cases, AR can be used by furniture retailers to allow customers to view virtual furniture within their home. As an example, a computer-generated representation of a couch can be overlaid with an image of a customer's living room so that the size and look of the couch in the living room can be appreciated. In other cases, AR can be used to provide "virtual dressing rooms" that allow customers to try on virtual clothes. For example, a computer-generated representation of a shirt can be overlaid with an image of the customer so that the customer may assess the fit of the shirt.

A drawback of using AR to create computer-generated representations of products is that many customers wish to physically interact with a product before deciding whether or not to purchase the product. Computer-generated representations of products fail to provide the complete sensory experience associated with a physical real-world item of a product, which typically includes a combination of a look, feel, smell, etc. Consider, for example, a customer that is interested in purchasing a couch for a room in their home. A computer-generated representation of a couch in the room may not provide enough information for the customer to decide whether or not to purchase the couch, as the customer is not able to feel the material of the couch or assess the comfort level of sitting on the couch. Similarly, a computer-generated representation of an article of clothing overlaid with an image of a customer may not provide enough information for the customer to decide whether or not to purchase the clothing. While the computer-generated representation might provide the customer with an indication of how the clothing looks, the customer is not able to assess other sensory attributes of the clothing using the computer-generated representation of the product.

In order to interact with physical items of products in the real-world, customers often travel to a location where the products are physically present. Examples of such locations include physical stores or 'brick-and-mortar' retail stores. However, the environment at these locations might not allow a customer to appreciate how the products will look in their intended settings. For example, a customer may want to purchase a couch for their bright sunlit living room, but the furniture showroom where the couch is sold does not resemble a bright sunlit room. Therefore, the customer may have to make a decision based on their expectation of how the couch would look in a sunlit room. Similarly, a customer may want to purchase clothes for a particular event, but a dressing room might not provide a suitable environment to evaluate the aesthetic of the clothes at the event.

An aspect of the present disclosure relates to a computer-implemented method for generating AR scenes for physical items. Such a method can allow a customer to both interact with a physical item and visualize how the physical item will look in certain settings. In some cases, the AR scene can depict the physical item in a setting that is specific to the physical item and/or to the customer. A generated AR scene includes an image of the physical item and computer-generated scenery. The computer-generated scenery can be superimposed with the physical item in the image to allow a customer to visualize the physical item in a different setting or environment. The computer generated scenery may be specific to the physical item and/or to the customer.

Generating AR Scenes for Physical Items

Figure 4:
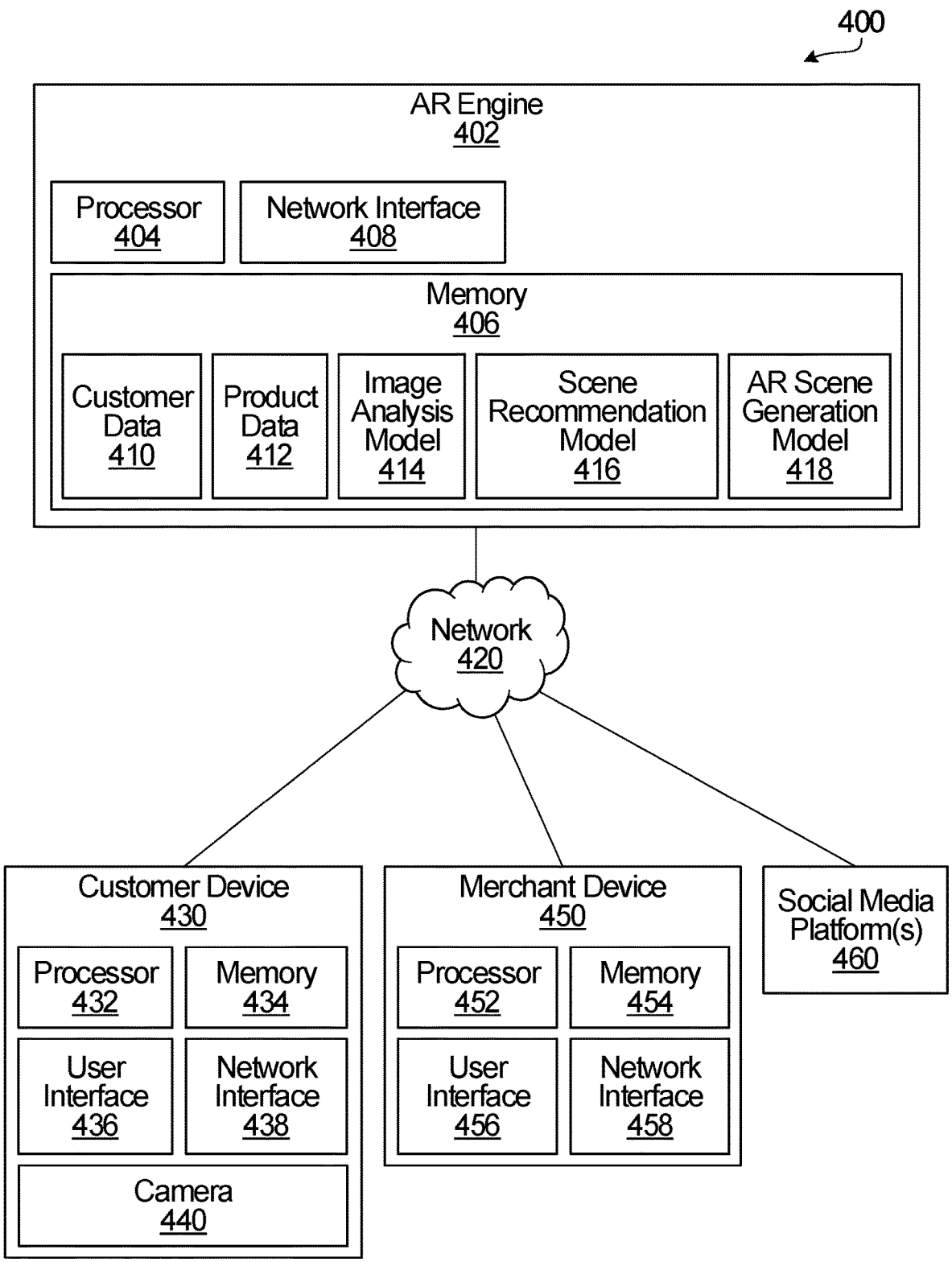
FIG. 4 is a block diagram illustrating an example system for generating AR content.

FIG. 4 is a block diagram illustrating an example system 400 for generating AR content. The system 400 includes an AR engine 402, a network 420, a customer device 430, a merchant device 450 and one or more social media platform(s) 460.

The AR engine 402 supports the generation of AR content, including AR scenes for physical real-world items. The location of the AR engine 402 is implementation specific. In some implementations, the AR engine 402 is provided at least in part by an e-commerce platform, either as a core function of the e-commerce platform or as an application or service supported by or communicating with the e-commerce platform. For example, the AR engine 402 could be the AR engine 300 of FIG. 3. In some implementations, the AR engine 402 is implemented at least in part by a user device such as a customer device or a merchant device. In other implementations, the AR engine 402 is implemented as a stand-alone service to generate AR content. Other implementations of the AR engine 402 are also contemplated. While the AR engine 402 is shown as a single component, the AR engine 402 could instead be provided by multiple different components that are in communication via the network 420, for example.

The AR engine 402 includes a processor 404, memory 406 and a network interface 408. The processor 404 may be implemented by one or more processors that execute instructions stored in the memory 406. Alternatively, some or all of the processor 404 may be implemented using dedicated circuitry, such as an application specific integrated circuit (ASIC), a graphics processing unit (GPU) or a programmed field programmable gate array (FPGA).

The memory 406 stores customer data 410, product data 412, an image analysis model 414, a scene recommendation model 416 and an AR scene generation model 418.

The customer data 410 includes information associated with one or more customers that use, or may potentially use, the AR engine 402. In some implementations, the customer data 410 includes information that is associated with the customers of the e-commerce platform 100. For example, the customer data 410 could include at least a portion of the data 134. Other implementations are possible. For example, in implementations where the AR engine 402 is a stand-alone service, the customer data 410 includes information that is obtained from an external source, e.g. the data 134 in the e-commerce platform 100 or some other repository of customer information made available directly by particular customers (e.g. via a shopping application installed on a customer device) or by merchant stores (e.g. via a database storing their customer information). For a given customer, the following is a non-limiting list of information that could be included in the customer data 410:

An identity of the customer, such as their name and/or customer number, for example.

The age, gender, height and/or other details of the customer.

Clothing size(s) for the customer, including a shirt, dress, pant and/or shoe size.

One or more locations associated with the customer, such at their workplace, home and/or favorite vacation destinations, for example. This could include the geometry, setting and other details of each location.

The identity of other customers that are associated with the customer, such as their friends and family, for example. This could include the age, gender, height and/or other details of the other customers.

Any pets that are owned or otherwise associated with the customer.

One or more products that the customer owns or has previously indicated an interest in. These products may have been viewed by the customer on an associated product page of an e-commerce platform, added to the customer's cart on the e-commerce platform and/or purchased from the e-commerce platform, for example.

Any style preferences or other preferences associated with the customer.

In some implementations, the customer data 410 includes one or more images that are associated with a customer. These images may relate to the customer information listed above. For example, images associated with a customer could include: images of the customer; images of one or more locations associated with the customer; images of other customers that are associated with the customer; and images of one or more products that the customer owns. The form of these images is not limited herein. In some implementations, the images could have been captured by a camera and provided to the AR engine 402. Computer-generated images are also contemplated. For example, the images may be in the form of virtual representations of people, locations and/or products. The images could be two-dimensional (2D) or three-dimensional (3D).

In some embodiments, the customer data 410 includes one or more 3D models that are associated with a customer. These 3D models may also relate to the customer information listed above. A 3D model is a mathematical representation of a subject, such as a person, location or item, for example. A 3D model defines the real-world dimensions of the subject. In some cases, a 3D model defines a coordinate system and/or a default orientation for the subject. Possible methods for generating 3D models include photogrammetry (creating a 3D model from a series of 2D images), 3D scanning (moving a scanner around the object to capture all angles) and 3D modelling (either from images or by hand). In some implementations, images that are stored in the customer data 410 are used to generate a 3D model. Other information stored in the customer data 410, such as the geometry of a location or the height of a person, may also be used to help generate a 3D model.

The customer data 410 could be obtained in any of a number of different ways. In some implementations, the customer data 410 is provided at least in part by a customer and/or a merchant. The customer data 410 could also or instead be obtained at least in part from a third party, such as from the social media platform(s) 460, for example. Some customer data 410, such as 3D models, may be generated locally at the AR engine 402.

The product data 412 includes information that is associated with one or more products. These products could be sold in online stores, physical stores or both. In some implementations, the product data 412 corresponds to any or all products sold on the e-commerce platform 100. For example, the product data 412 could include at least a portion of the data 134. Other implementations are possible. For example, in implementations where the AR engine 402 is a stand-alone service, the product data 412 includes information that is obtained from an external source e.g. the data 134 in the e-commerce platform 100 or some other repository of product information associated with a merchant store. The following is a non-limiting list of information that could be included in the product data 412 for each product:

A name and/or other identifier of the product.
An image of the product.
A virtual representation of the product, such as a 3D model of the product, for example.
The merchant(s) that sell the product.
The uses of the product.
The locations, environments or settings associated with the product.
The dimensions of the product.
The different variants of the product, such as the color(s) of the product, for example.
A color palette that complements the product.
A list of other products that are associated with, or complementary to, the product.

At least some of the product data 412 may be provided by one or more merchants. For example, the merchant device 450 could transmit information associated with a product to the AR engine 402. The AR engine 402 may also or instead obtain information associated with a product by extracting the information from an e-commerce platform or an online store, for example. In some implementations, a merchant may identify one or more products that are complementary to a particular product. For example, the particular product may be one of a collection of products that are sold by the merchant.

In some implementations, customers can provide information associated with a product that is added to the product data 412. Customer reviews and/or social media accounts can be used to gather information indicating that a product is well suited to particular uses and/or settings. For example, customers may place reviews for a jacket in an online store and/or in an e-commerce platform. These reviews indicate that the jacket works well in the rain. Further, the jacket may be tagged in images on the social media platform(s) 460 that depict the jacket being worn in the rain. The AR engine 402 could use either or both of these resources to determine that the jacket is used in the rain (i.e., rain is an environment or setting associated with the jacket), and add this information to the product data 412.

Although the customer data 410 and the product data 412 are illustrated separately, it should be noted that this is only an example. At least a portion of the customer data 410 and the product data 412 could instead be provided as a single data set. For example, some information could be associated with a product and with a customer. Consider an image obtained from the social media platform(s) 460 showing a particular customer wearing an item of a particular product. This image could be associated with the particular customer and with the particular product in the memory 406.

The image analysis model 414 is provided to analyse images stored and/or received by the AR engine 402. For example, to generate an AR scene based on a received image of a physical item, one or more properties of the received image might first need to be determined. The image analysis model 414 may be provided in the form of software instructions that are executable by the processor 404. Any of a number of different algorithms could be included in the image analysis model 414. Non-limiting examples of such algorithms include:

Object recognition algorithms;
Text recognition algorithms;
Algorithms for the detection of machine-readable codes, such as barcodes and quick response (QR) codes, for example;
Motion detection algorithms;
Image segmentation algorithms; and
Surface, corner and/or edge detection algorithms.

Further detail regarding image analysis algorithms can be found in *Computer Vision: Algorithms and Applications* by Richard Szeliski (Springer, 2010).

The image analysis model 414 can identify or detect the features of a physical item in an image. Examples of such features include the corners, surfaces, edges and/or dimensions of the physical item in the image. Feature detection could be performed in 3D, and may allow for a coordinate system (for example, a Cartesian coordinate system) to be mapped onto the image. Feature detection may also allow for the size and orientation of the physical item in the image could be determined using the image analysis model 414. In some implementations, the image analysis model 414 is used to determine that a physical item corresponds to a particular product.

In some implementations, user input could aid in feature detection for an image of a physical item. For example, a user could select the physical item within the image (e.g., by tracing their finger around its edge in a lasso-selection). Feature detection could then be limited to the traced area in order to avoid the detection of irrelevant features.

More than one image of a physical item could be input into the image analysis model 414. For example, multiple images of a physical item, taken from different locations relative to the physical item, could allow for improved feature detection. In particular, multiple images of a physical item could allow for a more accurate determination of the dimensions of the physical item. The multiple images could be obtained from a video of the physical item or from a device that includes multiple cameras disposed at different locations, for example.

In cases where the image analysis model 414 receives a video of a physical item, the image analysis model 414 could perform an initial feature detection operation to locate the features of the physical item. These features could then be tracked in subsequent images received from the video feed in real-time.

The scene recommendation model 416 includes one or more algorithms (possibly in the form of software instructions executable by the processor 404) that recommend scenes in which to present a physical item. A recommended scene may correspond to a particular environment and/or setting that is appropriate for presenting a physical item. A recommended scene may also or instead correspond to a particular environment and/or setting that is related to a particular customer. In other words, the recommended scene may be in some way complimentary to a physical item and/or to a customer.

A recommended scene is determined based on one or more inputs to the scene recommendation model 416. Examples of such inputs include: features of a physical item depicted in an image (determined using the image analysis model 414, for example); information associated with the product that corresponds to the physical item (obtained from the product data 412, for example); and information associated with a customer (obtained from the customer data 410, for example). The output of the scene recommendation model 416 is not a fully generated AR scene, but is instead a recommended scene in which to present the physical item. AR can then be used to depict the physical item in the recommended scene, as discussed in further detail below.

A scene that is recommended based on information associated with, and possibly specific to, a customer could be considered to be a scene that is personalized for the customer. Similar comments apply to a scene that is recommended based on information associated with, and possibly specific to, a physical item. In other words, a recommended scene may be tailored for a certain item and/or customer.

In some implementations, the scene recommendation model 416 generates or otherwise provides sensory content for a recommended scene, including visual, auditory and/or haptic content, for example. For example, the scene can include one or more 3D model(s). The sensory content could be obtained from the customer data 410 or the product data 412. Alternatively, the sensory content could be stored elsewhere in the memory 406, or even be stored remote from the memory 406.

In some embodiments, the scene recommendation model 416 is or includes a machine learning (ML) model. The ML model could be implemented using any form or structure known in the art. Example structures for the ML model include but are not limited to:
One or more artificial neural network(s);
One or more decision tree(s);
One or more support vector machine(s);
One or more Bayesian network(s); and/or
One or more genetic algorithm(s).

The ML model is trained using text, images or videos of items in real-world scenes, which could be obtained from customers (from the social media platform(s) 460, for example) and/or merchants (from an online store, for example). In some embodiments, the ML model is trained using data samples in the product data 412. In some embodiments, the ML model is trained using previous AR scenes that were generated for a particular customer. For example, the customer data 410 could store the scenes that a customer has selected in the past, and the ML model could be trained on these customer preferences.

The method used to train the ML model is implementation specific, and is not limited herein. Non-limiting examples of training methods include:
Supervised learning;
Unsupervised learning;
Reinforcement learning;
Self-learning;
Feature learning; and
Sparse dictionary learning.

Once trained, the ML model could receive information associated with a product and/or information associated with a user, and output a recommended scene in which to depict a physical item using AR. As an example, a training data set could include images, videos and/or text that associate a hockey jersey with a particular hockey arena. For example, the hockey jersey could correspond to a hockey team that plays in this hockey arena. The images and videos may depict the hockey jersey being worn at the hockey arena, and the text may include the name of the hockey team that plays in the hockey arena. The correlation between the hockey jersey and the hockey arena could be identified by the ML model during training. When the trained ML model is in use and receives an image of the hockey jersey as an input, the ML model might then recommend the hockey arena as a scene in which to display the hockey jersey to a customer. In some implementations, the ML model further identifies that the hockey arena is in the same city customer's home (using the customer data 410, for example), and therefore the hockey arena is associated with the customer. After the ML model has recommended the hockey arena as a scene in which to display the hockey jersey, a 3D model of the hockey arena could be obtained by the scene recommendation model 416 to form the scene for the hockey jersey.

The AR scene generation model 418 includes one or more algorithms (possibly in the form of instructions executable by the processor 404) that are capable of generating AR scenes for physical real-world items. Possible inputs to the AR scene generation model 418 include: an image of a physical item; one or more features of the image (determined using the image analysis model 414, for example); a scene in which to present the physical item; an anchor point within the scene at which to locate the physical item (received from a user device, for example); and an orientation of the scene relative to an orientation of the physical item (received from a user device, for example). The scene in which to present the physical item can include visual, auditory and/or haptic content. In some implementations, the scene includes one or more 3D model(s). The scene may be provided by the scene recommendation model 416, or it may be directly provided by a customer or merchant. In some implementations, the AR scene generation model 418 might not receive a scene as an input. Instead, the AR scene generation model 418 might be preconfigured with a scene in which to present a physical item.

The output of the AR scene generation model 418 is an AR scene that includes virtual or computer-generated scenery and at least a portion of the image of the physical item. The portion of the image of the physical item includes a depiction of the physical item. The computer-generated scenery is superimposed with the depiction of the physical item to form the AR scene.

In some embodiments, a generated AR scene contains multiple representations of physical items. The multiple representations may include an image of a physical item corresponding to one user and a virtual representation of another physical item corresponding to a different user. This is an example of social shopping, where multiple users are able to add items to an AR scene. For example, a customer may wish to buy furniture with a roommate for a shared living space. In this example, the customer and the roommate are referred to as primary and secondary users, respectively. The secondary user is associated with the primary user in the AR engine 402. For example, the primary user and secondary user may have granted each other certain permissions that are stored in the customer data 410. As such, the AR engine 402 enables the generation of AR scenes based on images or other content provided by both the primary user and the secondary user. The AR engine 402 also enables both the primary user and the secondary user to view respective AR scenes that depict the same or similar setting. The primary user may wish to buy a couch from a particular store and the secondary user may wish to buy a coffee table from a different store. The AR engine 402 identifies the desired couch in an image taken by the primary user and generates an AR scene of the shared living space around the couch. Another AR scene of the shared living space is generated around the coffee table for the secondary user upon the secondary user capturing an image of the coffee table. A virtual representation of the coffee table is illustrated in the AR scene shown to the primary user, and a virtual representation of the couch is illustrated in the AR scene shown to the secondary user. Therefore, both the primary user and secondary user can see an AR scene of the shared living space with the couch and coffee table. The AR scenes may be extended to more than two users in other social shopping scenarios.

Although the image analysis model 414, the scene recommendation model 416 and the AR scene generation model 418 are illustrated as separate models, this is only an example. Some embodiments could combine the functionality of any two or more of these models in a single model. For example, a single model could be provided to perform image analysis and generate scene recommendations. A single model could instead be provided to determine a recommended scene and generate an AR scene based on this recommended scene. Other implementations are also contemplated.

The network interface 408 of FIG. 4 is provided for communication over the network 420. The structure of the network interface 408 is implementation specific. For example, the network interface 408 may include a network interface card (NIC), a computer port (e.g., a physical outlet to which a plug or cable connects), and/or a network socket.

The customer device 430 is an example of a user device. The customer device 430 may be a mobile phone, tablet, laptop, projector, headset or computer owned and/or used by a customer. In some implementations, the customer device 430 is or includes implanted devices or wearable devices, such as a device embedded in clothing material or a device that is worn by a user such as glasses, with built-in displays allowing the user to view the real world and simultaneously view virtual elements that are overlaid with the real world. The customer device 430 includes a processor 432, memory 434, user interface 436, network interface 438 and camera 440. An example of a user interface is a display screen (which may be a touch screen), a gesture recognition system, a keyboard, and/or a mouse. The network interface 438 is provided for communicating over the network 420. The structure of the network interface 438 will depend on how the customer device 430 interfaces with the network 420. For example, if the customer device 430 is a mobile phone, headset or tablet, the network interface 438 may include a transmitter/receiver with an antenna to send and receive wireless transmissions to/from the network 420. If the merchant device is a personal computer connected to the network with a network cable, the network interface 438 may include, for example, a NIC, a computer port, and/or a network socket. The processor 432 directly performs or instructs all of the operations performed by the customer device 430. Examples of these operations include processing user inputs received from the user interface 436, preparing information for transmission over the network 420, processing data received over the network 420, and instructing a display screen to display information. The processor 432 may be implemented by one or more processors that execute instructions stored in the memory 434. Alternatively, some or all of the processor 432 may be implemented using dedicated circuitry, such as an ASIC, a GPU, or a programmed FPGA.

The camera 440 is provided to capture images in the form of photographs and/or videos, which can be stored in the memory 434. The camera 440 is one example of a device used for capturing an image of a physical item. A customer device could also or instead include other devices such as 3D scanners, for example, which can be used to generate 3D models. Although the camera 440 is shown as a component of the customer device 430, the camera could instead be implemented separately from the customer device and communicate with the customer device via wired or wireless connections, for example.

In some implementations, the customer device 430 is capable of identifying products that are of interest to the customer and/or are in close proximity to the customer device. For example, an image of a barcode or a QR code that is captured by the camera 440 could be used to identify the product corresponding to the barcode or QR code. The customer device 430 may also or instead include a radio-frequency identification (RFID) scanner (not shown) to detect an RFID tag on a product, which can be used to identify the product. An application stored in the memory 434 and executed by the processor 432 could match a barcode, QR code or RFID to a particular product. A particular product could instead be identified using the customer device 430 through direct customer input via the user interface 436. For example, knowing the name or identification number of the product, the customer could search for the product using an application stored in the memory 434.

In some implementations, the customer device 430 has AR capabilities. For example, an AR engine similar to the AR engine 402 could be implemented in part or in whole on the customer device 430. A software application may be installed on the customer device 430 that performs image analysis, produces scene recommendations and/or generates AR scenes locally (i.e., on the customer device 430). The software application could receive the customer data 410, the product data 412, the image analysis model 414, the scene recommendation model 416 and/or the AR scene generation model 418 from the AR engine 402.

It should be noted that the customer device 430 might not actually be a customer's personal device that the customer brought to a store. Instead, the customer device 430 may belong to a merchant and be provided for use by a customer. For example, the customer device 430 could be a headset or smart mirror located at the merchant's store that is for use by the customer and that already has scenes for the merchant's products preloaded. The customer might not even be actively using the customer device 430. For example, in the case of a smart mirror, an AR scene could be generated as soon as the customer approaches the smart mirror.

The merchant device 450 may be a mobile phone, tablet, laptop, or computer owned and/or used by a merchant. The merchant device 450 includes a processor 452, memory 454, user interface 456 and network interface 458. An example of a user interface is a display screen (which may be a touch screen), a keyboard, and/or a mouse. The network interface 458 is provided for communicating over the network 420. The structure of the network interface 458 will depend on how the merchant device 450 interfaces with the network 420. For example, if the merchant device 450 is a mobile phone or tablet, the network interface 458 may include a transmitter/receiver with an antenna to send and receive wireless transmissions to/from the network 420. If the merchant device is a personal computer connected to the network with a network cable, the network interface 458 may include, for example, a NIC, a computer port, and/or a network socket. The processor 452 directly performs or instructs all of the operations performed by the merchant device 450. Examples of these operations include processing user inputs received from the user interface 456, preparing information for transmission over the network 420, processing data received over the network 420, and instructing a display screen to display information. The processor 452 may be implemented by one or more processors that execute instructions stored in the memory 454. Alternatively, some or all of the processor 452 may be implemented using dedicated circuitry, such as an ASIC, a GPU, or a programmed FPGA.

In FIG. 4, one customer device and one merchant device are shown by way of example. In general, more than one customer device and/or merchant device may be in communication with the AR engine 402.

The social media platform(s) 460 facilitate the creation and sharing of content. In some cases, this content includes information that is associated with customers and/or products. As noted above, the AR engine 402 may obtain information from the social media platform(s) 460 to help generate AR scenes. The social media platform(s) 460 are in communication with the network 420.

The system 400 can be used to generate AR scenes for a customer that is interacting with a physical item of a product in the real-world. An example of generating AR scenes is described below with reference to FIG. 5, which is a flow diagram illustrating a method 500 according to an embodiment. The method 500 will be described as being performed by the AR engine 402 of FIG. 4, with the resulting AR scene being transmitted from the AR engine 402 to the customer device 430 for display on the customer device 430. However, the method 500 could instead be performed on the customer device 430 itself.

Step 502 is an optional step that includes storing, in the memory 406, a model to generate AR scenes. This model includes the AR scene generation model 418, and optionally includes the image analysis model 414 and the scene recommendation model 416. In some implementations, step 502 further includes generating the model to generate AR scenes. For example, in the case that the scene recommendation model 416 includes a ML model, step 502 could include training the ML model(s).

Step 504 includes obtaining, using the processor 404, an image of a physical item. This image is captured by the customer device 430, which is associated with a customer. For example, the image could have been captured by the camera 440, and transmitted to the AR engine 402 via the network 420. The image could then be stored in the memory 406. Alternatively, the image could be a previously captured image that is stored in the memory 434, the social media platform(s) 460 and/or the customer data 410.

The form of the image obtained at step 504 is not limited herein. In some implementations, the image is a photograph, and in other implementations the image is one frame of a video. The image could be two-dimensional (2D) or three-dimensional (3D). In some implementations, 3D image of a physical item, or multiple 2D images of a physical item, could be converted to a 3D model of the physical item.

It should be noted that in cases where the method 500 is performed entirely on the customer device 430, step 504 might not include transmitting the image over the network 420. Rather, the image could simply be obtained from the camera 440 or from the memory 434 by the processor 432.

Step 506 is an optional step that includes determining, using the processor 404, a product that corresponds to the physical item. In other words, the physical item is identified as an item of the product. This may also be referred to as product identification, and can be performed in any of a number of different ways.

In some implementations, step 506 includes analysing the image obtained in step 504 using the image analysis model 414. For example, the image analysis model 414 could implement an object recognition operation to cross-reference the depiction of the physical item in the image with information in the product data 412 to find a product that matches the physical item.

In some implementations, step 506 includes receiving an explicit or implicit indication of the product. Non-limiting examples of such an indication include: the customer scanning a barcode, QR code or RFID tag for the product using the customer device 430; and the customer searching for the product using the user interface 436. By way of example, the customer could access and search the product data 412 to locate the product that corresponds to the physical item. A merchant could also or instead provide an indication of the product using the merchant device 450.

Step 508 includes obtaining, using the processor 404, information associated with at least one of the customer and the physical item. This information could be stored in the customer data 410 and/or the product data 412. Alternatively, the information could be stored in other locations, such as the customer device 430, the merchant device 450 or the social media platform(s) 460, for example.

In some implementations, step 508 includes obtaining a scene in which to display the physical item. For example, step 508 could include inputting information associated with the customer and/or the physical item into the scene recommendation model 416, and generating a recommended scene for the physical item. As noted above, the scene recommendation model 416 may be or include an ML model. In this case, step 508 can includes inputting the information associated with the customer and/or the physical item into the ML model to produce a recommended scene. Alternatively, step 508 could include receiving direct input from the customer device 430 or the merchant device 450 that indicates or otherwise provides a scene for the physical item.

In some implementations, step 508 includes obtaining a 3D model associated with at least one of the customer and the physical item. For example, this 3D model could be of a particular scene that is associated with the customer and/or the physical item. Consider a case in which step 504 includes obtaining an image of the customer trying on a pair of running shoes. In this case, step 508 could include obtaining information that indicates the customer prefers to run in a particular park near their house (for example, this information could have been obtained from the customer's account on a social fitness platform), and obtaining a 3D model of the park. This 3D model would be associated with both the customer and the pair of running shoes they are trying on.

In some implementations, step 508 includes obtaining a plurality of 3D models. At least some (but not necessarily all) of the plurality of 3D models are associated with at least one of the customer and the physical item. In these implementations, the method 500 might further include a step of receiving a selection of a 3D model from the plurality of 3D models. For example, the plurality of 3D models could be presented to the customer through the user interface 436. The customer could use the user interface 436 to select a particular 3D model to form the basis of the generated AR scene. Referring again to the case in which step 504 includes obtaining an image of the customer trying on a pair of running shoes, step 508 could include obtaining multiple 3D models for locations that the customer goes running. These multiple 3D models could be presented to the customer using the user interface 436, and the customer may select the 3D model of the park near their house to form the basis of the generated AR scene.

In the case that a product corresponding to the physical item is determined in step 506, then the information obtained at step 508 may be associated with at least one of the user and the product. In some implementations, step 508 includes obtaining an indication of an additional product that is associated with at least one of the customer and the product determined at step 506. An additional product that is associated with a customer could be a product that is owned by the customer, or a product that is owned by a friend or family member of the customer, for example. An additional product that is associated with the product determined at step 506 could be any product that is sold by the same merchant, any product that is known to be used together with the product determined at step 506, or any product that is in some way complementary to the product determined at step 506. Referring once again to the case in which step 504 includes obtaining an image of the customer trying on a pair of running shoes, step 508 could include obtaining an indication of running shorts that are owned by the customer and that are sold by the same merchant as the pair of running shoes. Thus, the running shorts are an additional product that is associated with the customer and the running shoes. Step 508 could also include obtaining a 3D model of the running shorts.

In some implementations, the information obtained in step 508 includes one or more images that are associated with at least one of the customer and the physical item. A 3D model could then be generated from the images using photogrammetry or 3D modeling, for example.

In some implementations, the information obtained at step 508 may be dependent on the country or region where the customer is located. For example, products that are associated with a dining room table in North America might include knives and forks, whereas products that are associated with a dining room table in Japan might include chopsticks.

In step 510, the processor 404 generates an AR scene including computer-generated scenery and at least a portion of the image. The portion of the image includes the physical item so as to depict the physical item in the AR scene. The computer-generated scenery includes visual content and may further include audio content and haptic content. The image of the physical item is superimposed with the computer-generated scenery, creating an AR scene that depicts the physical item in a setting that is different from the real-world setting for the physical item.

It should be noted that the image obtained at step 504 could include multiple physical items, and any or all of these physical items could be depicted in the AR scene. As such, the AR scene can include multiple depictions of physical items.

The computer-generated scenery of the AR scene generated in step 510 is based on the information obtained in step 508. As such, computer-generated scenery may be complimentary to the product or the customer. If the information obtained in step 508 includes an indication of a location, then the computer-generated scenery may include a virtual representation of that location. If the information obtained in step 508 includes an indication of a person or a pet, then the computer-generated scenery may include a virtual representation of that person or pet. If the information obtained in step 508 includes an indication of a product, then the computer-generated scenery may include a virtual representation of that product. As noted above, at least a portion of the information obtained in step 508 may be in the form of one or more 3D model(s), such as a 3D model of a location, person, pet or product. In such cases, the computer-generated scenery would be based at least in part on the 3D model(s).

In some implementations, step 510 includes determining features of the physical item in the image. For example, using the image analysis model 414, the edges, corners, surfaces of physical item can be detected. Optionally, the features are detected in 3D. Customer input may be used to aid in the feature detection. For example, a customer could use the user interface 436 to identify the outline of the physical item in the image using a lasso-selection. This could help identify a rough boundary of the physical item in the image, which can be further refined using the image analysis model 414. The features of the physical item can help identify the portion of the image that includes the physical item and obtain the depiction of the physical item from the image.

In some implementations, step 510 also includes determining the real-world dimensions of the physical item and scaling the computer-generated scenery relative to the dimensions of the physical item. This scaling can help ensure that the size of the physical item is depicted appropriately in the AR scene. In some cases, the dimensions of the physical item could be determined using the image analysis model 414. The image analysis model 414 may determine the dimensions of the physical item, possibly using multiple images of the physical item. However, the dimensions of a physical item could be determined in other ways. For example, if a product corresponding to the physical item is determined in step 506, then the dimensions of the product can be obtained from the product data 412, for example. The dimensions of the physical item could also be received as customer input via the user interface 436 or as merchant input via the user interface 456.

In some implementations, step 510 includes anchoring the portion of the image depicting the physical item to a virtual point in the computer-generated scenery. Anchoring the portion of the image can include defining an anchor point and/or an orientation for the physical item in the computer-generated scenery in order to properly situate the depiction of physical item relative to the computer-generated scenery. In some cases, the computer-generated scenery defines a coordinate system, and features of the physical item in the image are mapped onto this coordinate system to position the depiction of the physical item in the AR scene. In some implementations, an indication of an anchor point and/or an orientation for the physical item in the AR scene is received from a customer or a merchant using either of the user interfaces 436, 456. However, an anchor point and/or orientation of the physical item might not be indicated by a user, and can instead be preconfigured for a particular scene.

In some implementations, step 510 is performed at least in part using the AR scene generation model 418. By way of example, to generate the AR scene, the AR scene generation model 418 may receive as inputs: an image of a physical item; the features of the physical item in the image; the dimensions of the physical item; a 3D model; and an anchor point and an orientation of the physical item in the 3D model. The AR scene generation model 418 can then process the 3D model and the image of the physical item to generate the AR scene. The AR scene generation model 418 scales the 3D model to properly convey the size of the physical item at the anchor point. The AR scene generation model 418 also reorients the 3D model based on the desired orientation of the physical item in the scene. After the 3D model is scaled and oriented, a 2D render of the 3D model is captured. This 2D render is an example of computer-generated scenery for the AR scene. Using the outer edges of the physical item in the image, the AR scene generation model 418 can superimpose or overlay the 2D render on the image of the physical item. The 2D render is overlaid on the image of the physical item such that the depiction of the physical item is visible at the anchor point, which produces an AR scene for the physical item. This process can be repeated for further 3D models that are to be added to the AR scene.

Consider again the case in which: (i) step 504 includes obtaining the image of the customer trying on a pair of running shoes; and (ii) step 508 includes obtaining a 3D model of a park near the customer's house and obtaining a 3D model of a pair of running shorts that are owned by the customer. In this case, the AR scene generated at step 510 includes a portion of the image that depicts the customer and the pair of running shoes they are trying on. The AR scene generated at step 510 also includes computer-generated scenery from the 3D model of the park near the customer's house and from the 3D model of the running shorts. The computer-generated scenery could overlay or mask image of the customer trying on the pair of running shoes. For example, if the customer is trying on the pair of running shoes in a store, the computer-generated scenery could mask the portion of the image that corresponds to the store. The final AR scene depicts the customer in the park, where the customer is wearing the running shoes and the running shorts.

In another example, a customer is purchasing a shelving unit in a store. An AR scene for the shelving unit could include virtual representations of products that are shown on the shelves. These products may be owned by the customer, or they may be products that have been identified by the merchant as being complementary to the shelving unit.

Although some of the examples describe above include the use of a 3D model to produce an AR scene in step 510, it should be noted that a 3D model need not be used in all implementations. As an example, the information obtained at step 508 could indicate that a customer will use the physical item in a bright sunlight room, and the AR scene generated at step 510 could include computer-generated scenery that brightens an image of a physical item to resemble a sunlight room. In other words, the real-world scene for the physical item is augmented to add or remove light sources. As another example, the information obtained at step 508 could be a 2D image associated with a customer and/or a physical item, and the 2D image could be used to form the computer-generated scenery in step 510. While it might not be possible to reorient scenery that is based on a 2D image, 2D images may still be appropriate in some cases. For example, in the case of computer-generated scenery that is based on a 2D image of a beach, a customer might not mind that the beach is always displayed at the same orientation.

Step 512 includes instructing the customer device 430 to display the AR scene generated in step 510. In some implementations, step 512 is performed by the processor 404 transmitting content to the customer device 430 via the network 420. This content includes the particular AR scene, along with an instruction to display the AR scene to the customer on the user interface 436. However, in embodiments where the method 500 is performed on the customer device 430, step 512 might include the processor 432 instructing the user interface 436 to display the AR scene.

Consider once again the case in which the AR scene generated at step 510 includes: (i) a portion of the image obtained in step 504 showing a customer and a pair of running shoes they are trying on; and (ii) computer-generated scenery depicting the park near the customer's house and depicting the customer wearing the running shorts. When this AR scene is presented to the customer following step 512, the customer is able to assess how the shoes and shorts look together in the park near their house. Advantageously, the customer is able to view and assess the shoes in this setting while also physically interacting with the shoes. The customer is therefore able to determine if the shoes fit properly and are comfortable.

In some embodiments, an AR scene includes, or is displayed with, a virtual assistive avatar to answer queries and provide additional details on a product. For example, a customer may wish to buy a loudspeaker for an event at a banquet hall. An AR engine identifies the desired loudspeaker and generates an AR scene of a banquet hall. The AR scene includes a virtual assistive avatar to answer customer questions regarding the specifications of the loudspeaker. The virtual assistive avatar may further suggest the most efficient usage of the loudspeaker in the generated AR scene.

Figure 5:
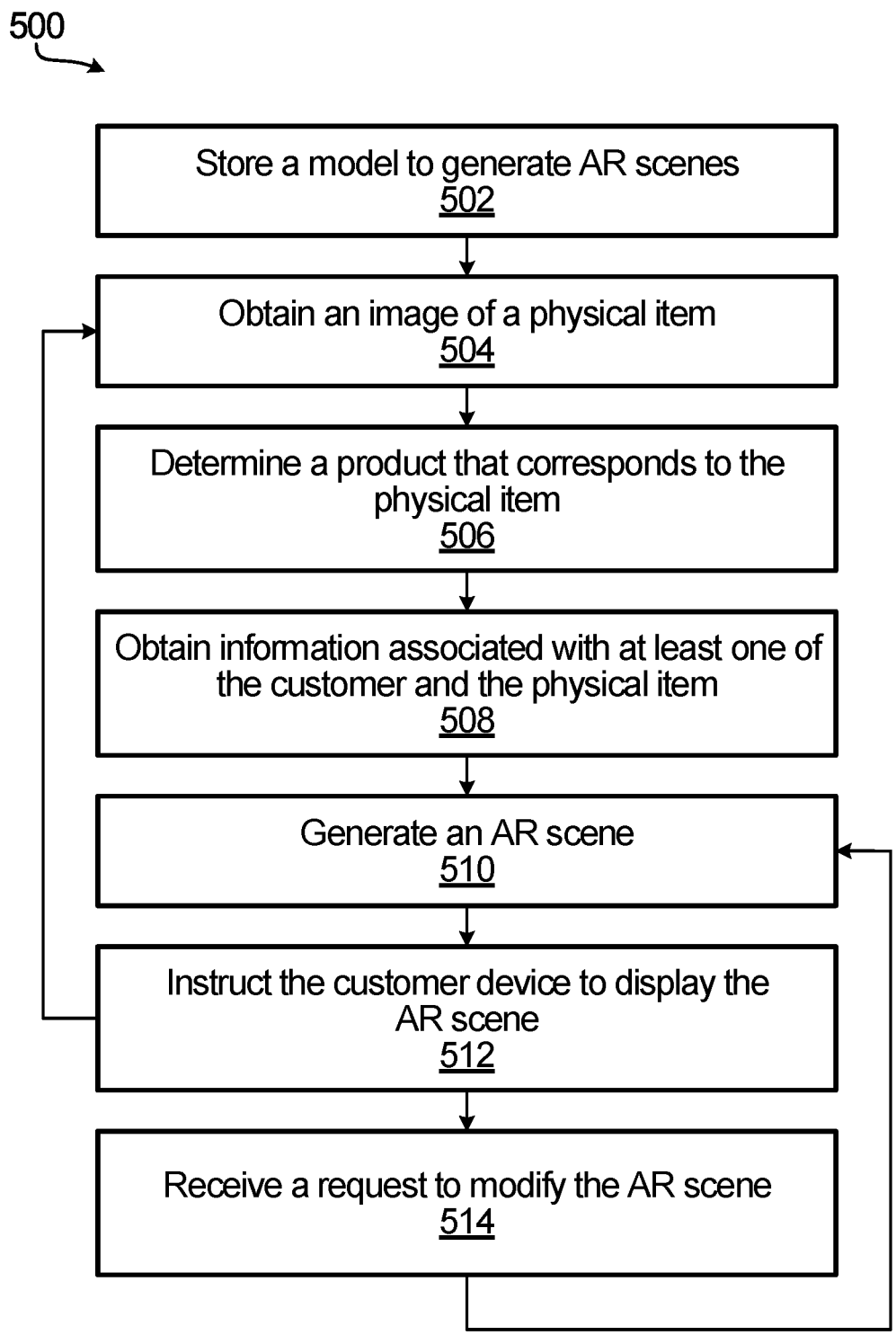
FIG. 5 is a flow diagram illustrating a method according to an embodiment.

The method 500 may repeatedly or continuously produce AR scenes for a physical item in real-time. This is shown in FIG. 5 as an arrow from step 512 to step 504. For example, a stream of images may be received in the form of a real-time video of a physical item, where each image in the stream corresponds to one instance of step 504. In each image, the view of the physical item could be continuously changing, resulting in changes to the size and orientation of the physical item in the images. Step 510 could be repeatedly performed to generate a new AR scene for each image of the physical item. In some implementations, image analysis is performed to track the product in the video feed in real-time. A customer device may include sensors (for example, motion sensors, gyroscopes and accelerometers) to track changes of the position and orientation of a camera between different acquired images, which may be used to help track the changes in the depiction of the physical item in the images. For each generated AR scene, the depiction of the physical item could be anchored at a particular point and in a particular orientation relative to the computer-generated scenery, and therefore changes to the orientation and/or size of the item in the images could result in changes to the computer-generated scenery. In other words, the computer-generated scenery is locked in place relative to the depiction of the physical item. This provides the generation of dynamic AR scenes. It should be noted that either or both of steps 506, 508 might only be performed once for a video of a physical item.

Step 514 is an optional step that includes the processor 404 receiving a request to modify or change the AR scene generated in step 510. For example, after viewing the AR scene, a customer may request a modification to some aspect of the AR scene. Non-limiting examples of such modifications include:

- A change to the setting or environment of the AR scene.
- A change to the size, anchor point and/or orientation of the physical item in the AR scene.
- Adding or removing the customer, or another person, to/from the AR scene.
- A change to the size, position and/or orientation of the customer, or another person, depicted in the AR scene.
- Adding or removing another item (different from the physical item) to/from the AR scene.
- A change to the size, position and/or orientation of another item (different from the physical item) in the AR scene.

In some implementations, the request to modify the particular AR scene is generated by the customer using the user interface 436. For example, the customer could use a mouse, keyboard, touch screen or gesture or voice recognition system to generate the request to modify the particular AR scene. This request is then transmitted from the customer device 430 to the AR engine 402. A merchant using the merchant device 450 might also generate a request to modify the particular AR scene.

In some implementations, the request to modify the AR scene includes a request to move, resize and/or reorient the physical item depicted in the AR scene. This allows the interactive placement and/or configuration of the physical item in the AR scene. Moving a physical item depicted in an AR scene may correspond to a change in the anchor position for the physical item relative to the computer-generated scenery.

Upon receipt of the request to modify or change the particular AR scene, the method 500 returns to step 510 to generate a modified AR scene based on the request. This is shown using an arrow from step 514 to step 510 in FIG. 5. After generating the modified AR scene, step 512 instructs the customer device 430 to display the modified AR scene.

In some embodiments, step 510 might include the generation of a plurality of AR scenes based on the information obtained in step 508, and step 512 includes instructing the customer device 510 to display the plurality of AR scenes. The method 500 could include a further step of receiving a selection of a particular AR scene from the plurality of AR scenes from the customer. Following the selection, the customer may then be shown only the particular AR scene.

In some embodiments, two iterations of step 504 are performed to enable social shopping. In the first iteration of step 504, the processor 404 obtains a first image of a first physical item, the first image having been captured by a first customer device associated with a first customer. In the second iteration of step 504, the processor 404 obtains a second image of a second physical item different from the first physical item, the second image having been captured by a second customer device associated with a second customer. A first iteration of step 506 may be performed for the first physical item, where a product is identified that corresponds to the first physical item. A second iteration of step 506 may be performed for the second physical item, where a product is identified that corresponds to the second physical item. A first iteration of step 508 is performed for the first image, where information associated with at least one of the first customer and the first physical item is obtained. A second iteration of step 508 may also be performed, where information associated with at least one of the second customer and the second physical item is obtained. In these embodiments, a first AR scene is generated in step 510 which includes at least a portion of the first image, a virtual representation of the product from the second image, and computer-generated scenery. A second AR scene may also be generated in step 510 which includes at least a portion of the second image, a virtual representation of the product from the first image, and computer-generated scenery. The virtual representations of the two products may be based on images or 3D models sent from the customer devices, or may be based on 3D models that are accessed via product lookup. The computer-generated scenery could be based on any of the information determined at step 508 and may be the same for both the first and the second AR scenes. The first AR scene may be displayed on the first customer device following step 512, and the second AR scene may be displayed on the second customer device following step 512. The two AR scenes may depict the objects in their scenes (both physical and virtual) in the same relative locations as each other, such that the first physical item in the first AR scene and the virtual representation of the first physical item in the second AR scene are displayed in the same location in the first and second AR scenes, and same for the second physical item and its virtual representation. Thus, the two customers are able to share a similar shopping experience.

The method 500 is provided by way of example. Other methods for generating AR scenes are also contemplated. For example, step 504 of the method 500 could be omitted in some embodiments. Consider the case of a transparent display device positioned between a customer and a physical item, such that the customer can view the physical item through the display device. Steps 508, 510 could be performed to obtain computer-generated scenery that is associated with at least one of the customer and the physical item. The computer-generated scenery could then be displayed on the transparent display device, around the portion of the display device that allows the customer to view the physical item, in order to depict the physical item in a virtual scene. The position of the customer relative to the display device may be tracked in order to appropriately overlay the computer-generated scenery on the display device.

Example AR Scenes for Physical Products

Reference will now be made to FIGS. 6 to 17, which provide examples of generating an AR scene for a customer that is interested in purchasing a couch 602 for their living room. The couch 602 is a physical item of a product that the customer is interacting with in a real-world store.

Figure 6:
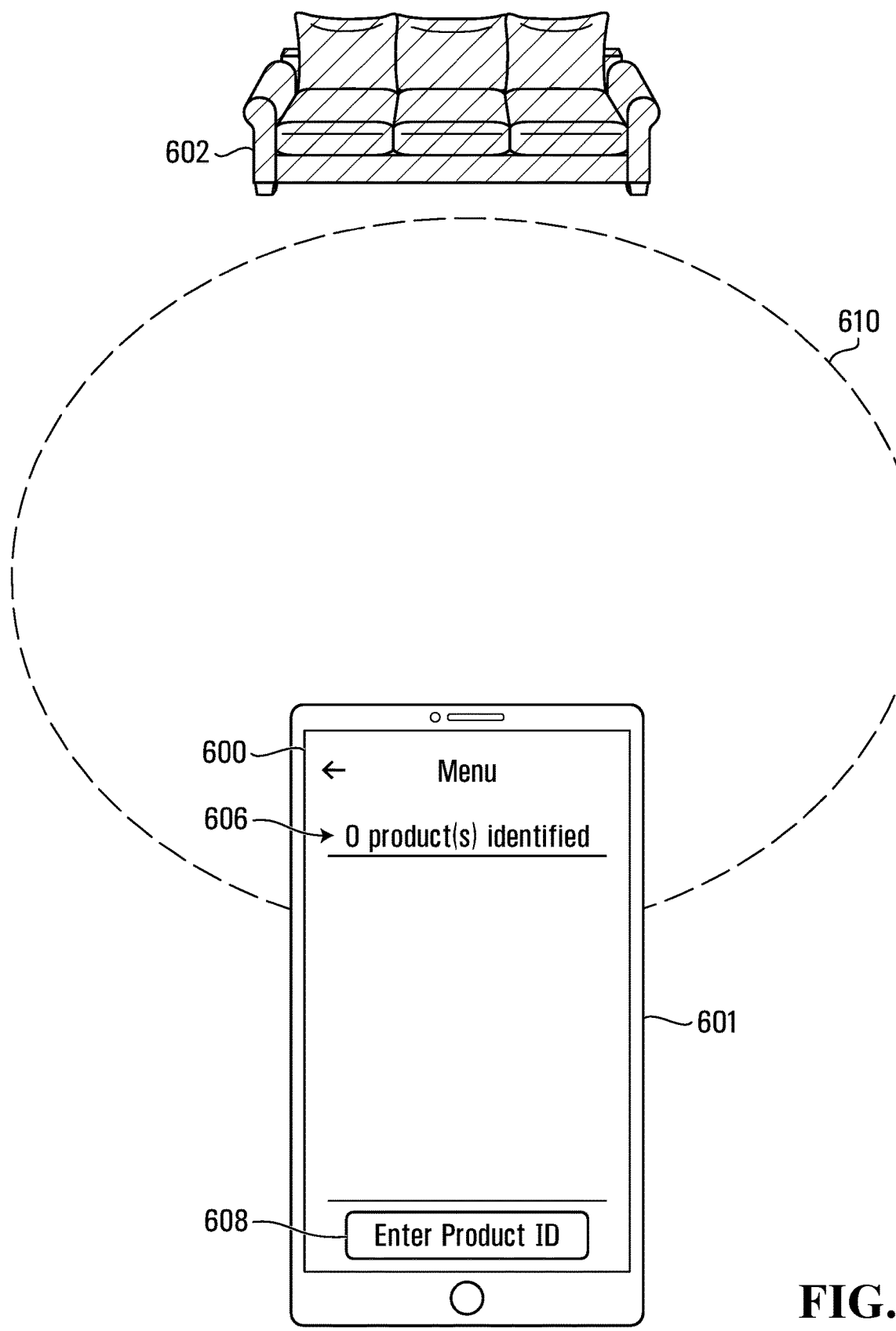
FIGS. 6 to 8 are diagrams illustrating a customer identifying a product corresponding to a couch, according to some embodiments.
Figure 7:
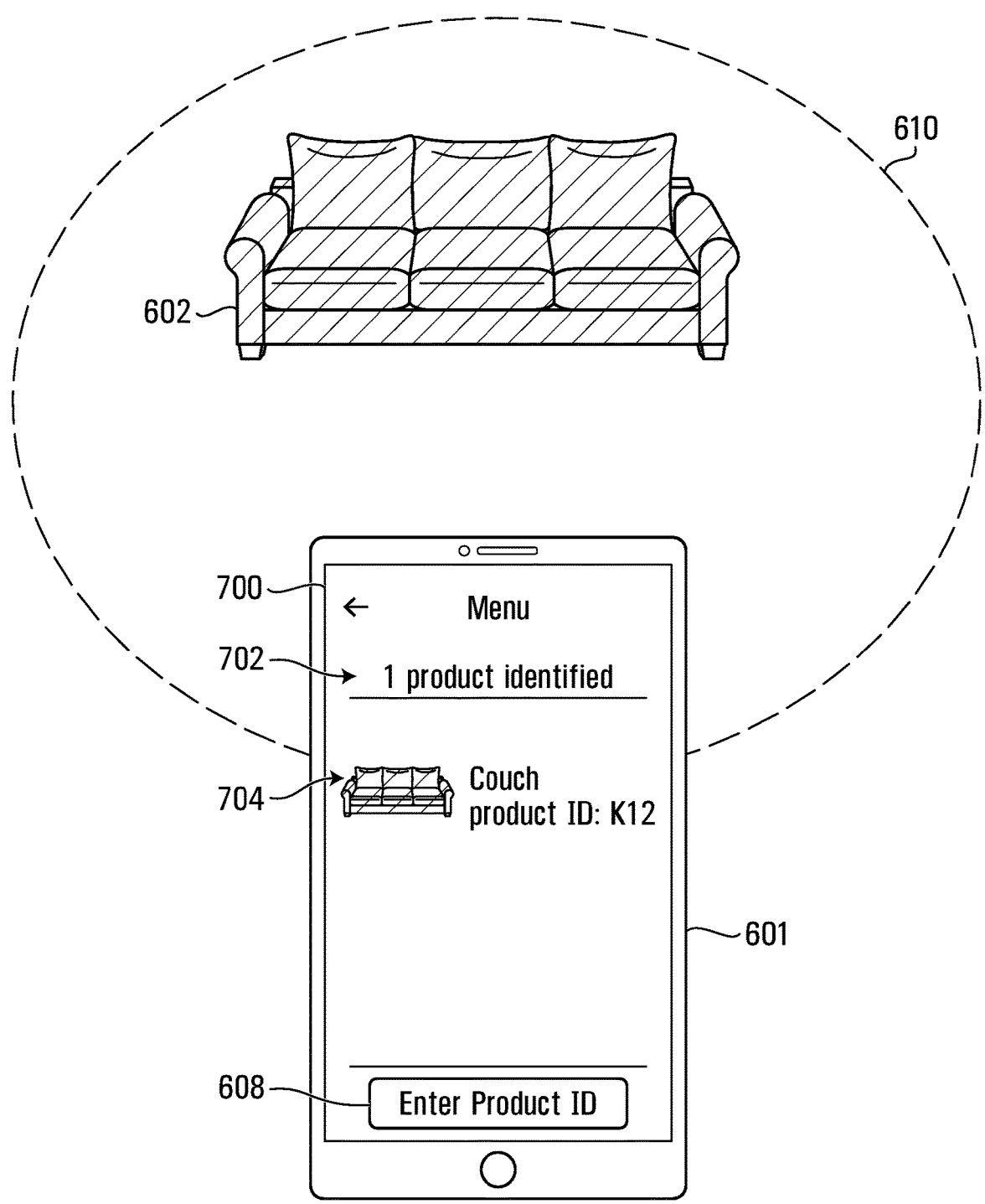
Figure 8:
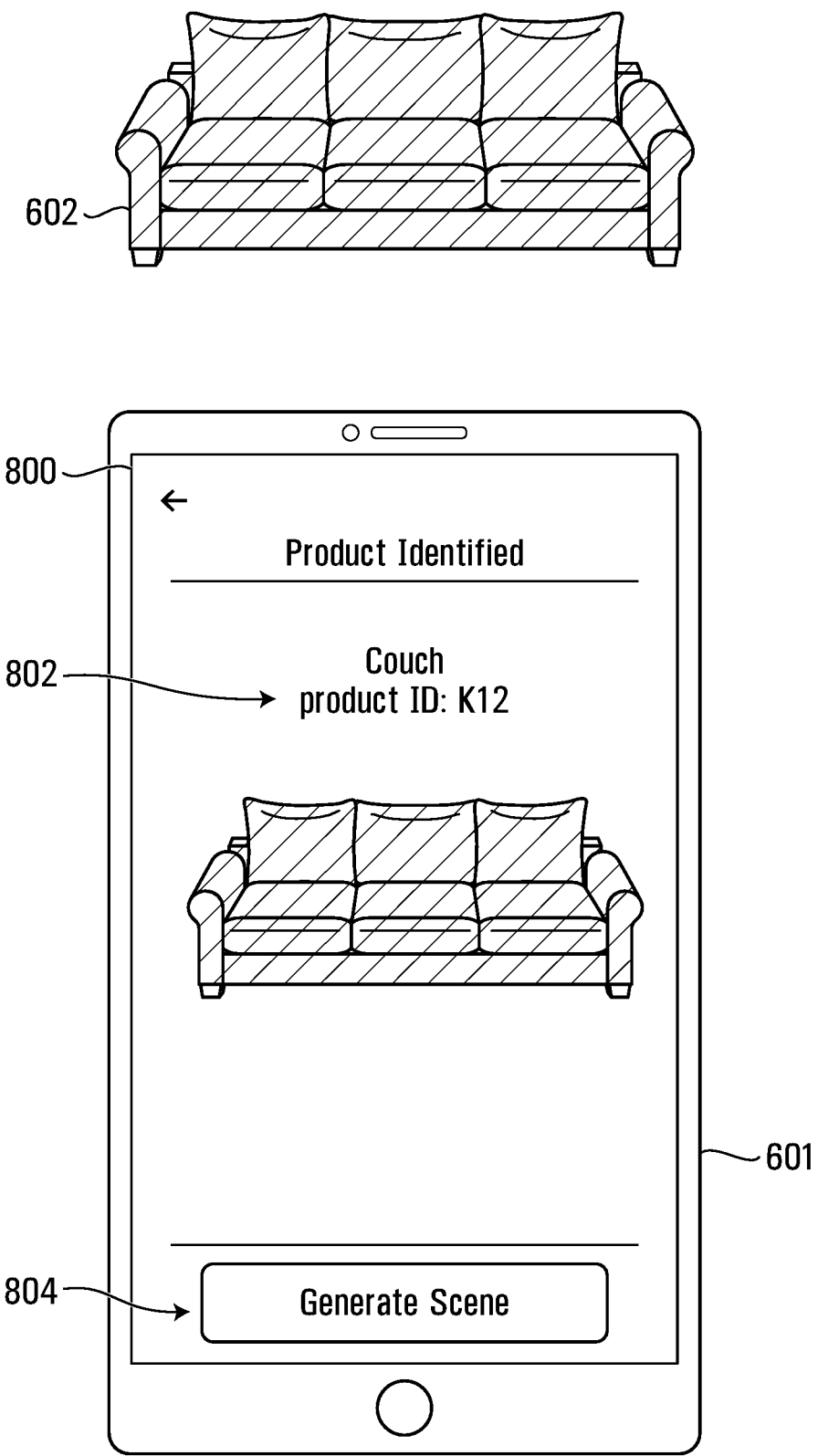

FIGS. 6 to 8 are diagrams illustrating the customer identifying a product corresponding to the couch 602, according to some embodiments. The couch 602 has an RFID tag that is readable by a customer device 601 associated with the customer, which can be used to provide an indication of a product corresponding to the couch 602. The RFID tag has a particular range 610. FIG. 6 illustrates the customer device 601 outside of the range 610 of the RFID tag. Because the customer device 601 is outside the range 610, the couch 602 is not detected by the customer device 601. FIG. 6 further illustrates a screen page 600 displayed on the customer device 601. The screen page 600 includes an indication 606 that no RFID tags have been detected, and an option 608 to enter a product identifier (ID) to search for a product manually.

FIG. 7 illustrates the customer device 601 inside of the range 610 of the RFID tag on the couch 602 (i.e., the customer is in close proximity to the couch 602). Therefore, the RFID is readable by the customer device 601. FIG. 7 also illustrates a screen page 700, displayed on the customer device 601, including an indication 702 that an RFID tag has been detected and an indication 704 of a product corresponding to the couch 602.

The customer may select the indication 704, in which case the customer device 601 displays a screen page 800 shown in FIG. 8. The screen page 800 includes an indication 802 of the product corresponding to the couch 602, which includes an image and a product ID. The customer may compare the image and/or the product ID to the real-world couch 602 to confirm that the product matches the couch 602. The screen page 800 further includes an option 804 to generate an AR scene for the couch 602.

In some embodiments, the screen pages 600, 700, 800 are displayed to a customer during step 506 of the method 500. However, it should be noted that the method of identifying the product corresponding to the couch 602 shown in FIGS. 6 to 8 is only an example. The customer device 601 may also identify the product corresponding to the couch 602 using barcodes, QR codes and/or an image of the couch 602.

FIG. 9 is a diagram illustrating a selection of a recommended scene for the couch 602, according to an embodiment. FIG. 9 includes a screen page 900 shown on the customer device 601. The screen page 900 includes multiple recommended scenes 902, 904, 906 in which to display the couch 602. Each of the scenes 902, 904, 906 is associated with a respective 3D model. The scene 902 is based on (for example, generated using) images of the user's living room, scene 904 is based on images of a condo, and scene 906 is based on images of a patio. All of the scenes 902, 904, 906 are associated with the couch 602 at least in that the scenes 902, 904, 906 depict locations where the couch 602 could be used. For example, any or all of the scenes 902, 904, 906 could be based on images stored in the product data 412 of the system 400. The scene 902 is also associated with the customer, as the scene 902 depicts the customer's home. As such, the scene 902 could be based on an image stored in the customer data 410 of the system 400.

Selection of one of the scenes 902, 904, 906 results in the generation of an AR scene for the couch 602 that is based on that scene. The screen page 900 further includes an option 908 to search for a specific scene.

FIG. 10 is a diagram illustrating a search for a specific scene for the couch 602, according to an embodiment. FIG. 10 includes a screen page 1000 shown on the customer device 601. The screen page 1000 includes a search bar 1002, and multiple scenes 1004, 1006 in which to display the couch 602. Each of the scenes 1004, 1006 is associated with a respective 3D model. The scenes 1004, 1006 match the search criteria in the search bar 1002. In some implementations, the search criteria in the search bar 1002 is compared against information associated with the customer and/or information associated with the couch 602. If the search criteria matches any information associated with the customer or information associated with the couch 602, then this information is used to produce a recommended scene. The scene 1004 is associated with the customer, whereas the scene 1006 is associated with the couch 602. Selection of one of the scenes 1004, 1006 could lead to the generation of an AR scene for the couch 602 that is based on that scene.

In some implementations, either or both of the screen pages 900, 1000 are generated following step 508 of the method 500.

Figure 11:
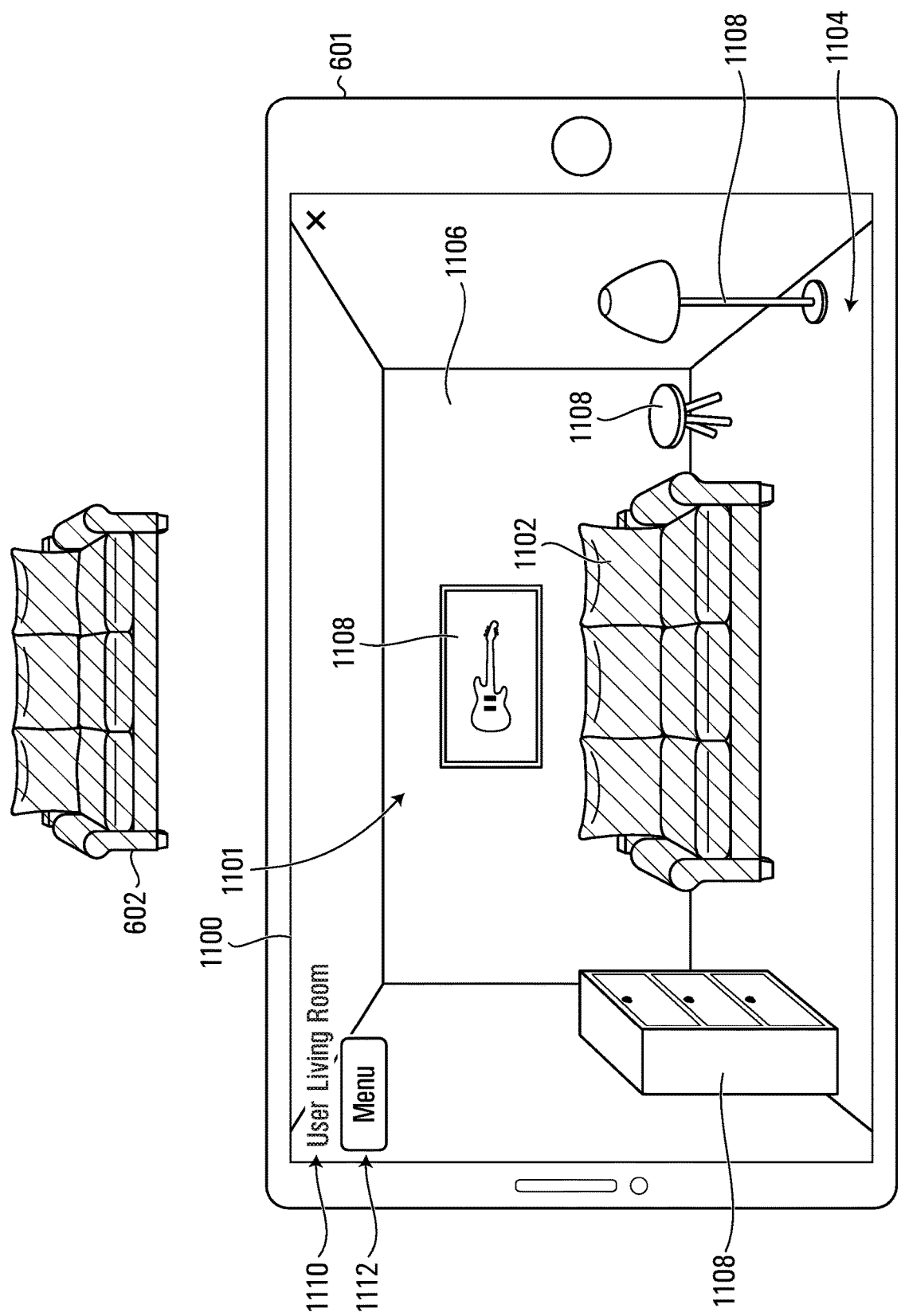
FIGS. 11 and 12 are diagrams illustrating an AR scene displayed on a customer device, according to some embodiments.

FIG. 11 is a diagram illustrating an example AR scene 1101 displayed on the customer device 601, according to an embodiment. FIG. 11 includes a screen page 1100 showing the AR scene 1101 that is based on the scene 902 of FIG. 9. For example, the AR scene 1101 could have been generated following the selection of the scene 902 by the customer. The AR scene 1101 includes a depiction 1102 of the couch 602 and computer-generated scenery 1104. The screen page 1100 further includes an indication 1110 that the AR scene 1101 corresponds to the customer's living room and an option 1112 to access a menu for the AR scene 1101.

The depiction 1102 of the couch 602 represents a portion of an image of the couch 602 taken by the customer device 601. The customer device 601 is actively capturing the image of the couch 602 in real-time. The computer-generated scenery 1104 shows the customer's living room including a plurality of other products 1108 associated with the customer. The computer-generated scenery 1104 is a 2D render from the 3D model for the scene 902. The 2D render is generated (for example, scaled) based on the dimensions of the couch 602, an anchor point for the depiction 1102 in the computer-generated scenery 1104, and an orientation of the depiction 1102 in the computer-generated scenery 1104. The dimensions of the couch 602 could have been determined when the product corresponding to the couch 602 was determined, as shown in FIG. 8. Alternatively, the dimensions of the couch 602 could have been determined using image processing. The anchor point and orientation of the depiction 1102 in the computer-generated scenery 1104 could be predetermined for the scene 902, or could have been received as an input from the customer via the customer device 601, for example. In the illustrated example, the depiction 1102 is anchored to a wall 1106 in the customer's living room and oriented to face away from the wall 1106. Thus, the computer-generated scenery 1104 is overlaid with the image of the couch 602 such that the depiction 1102 of the couch 602 is shown against the wall 1106.

In some embodiments, the AR scene 1101 is generated in step 510 in the method 500.

Figure 12:
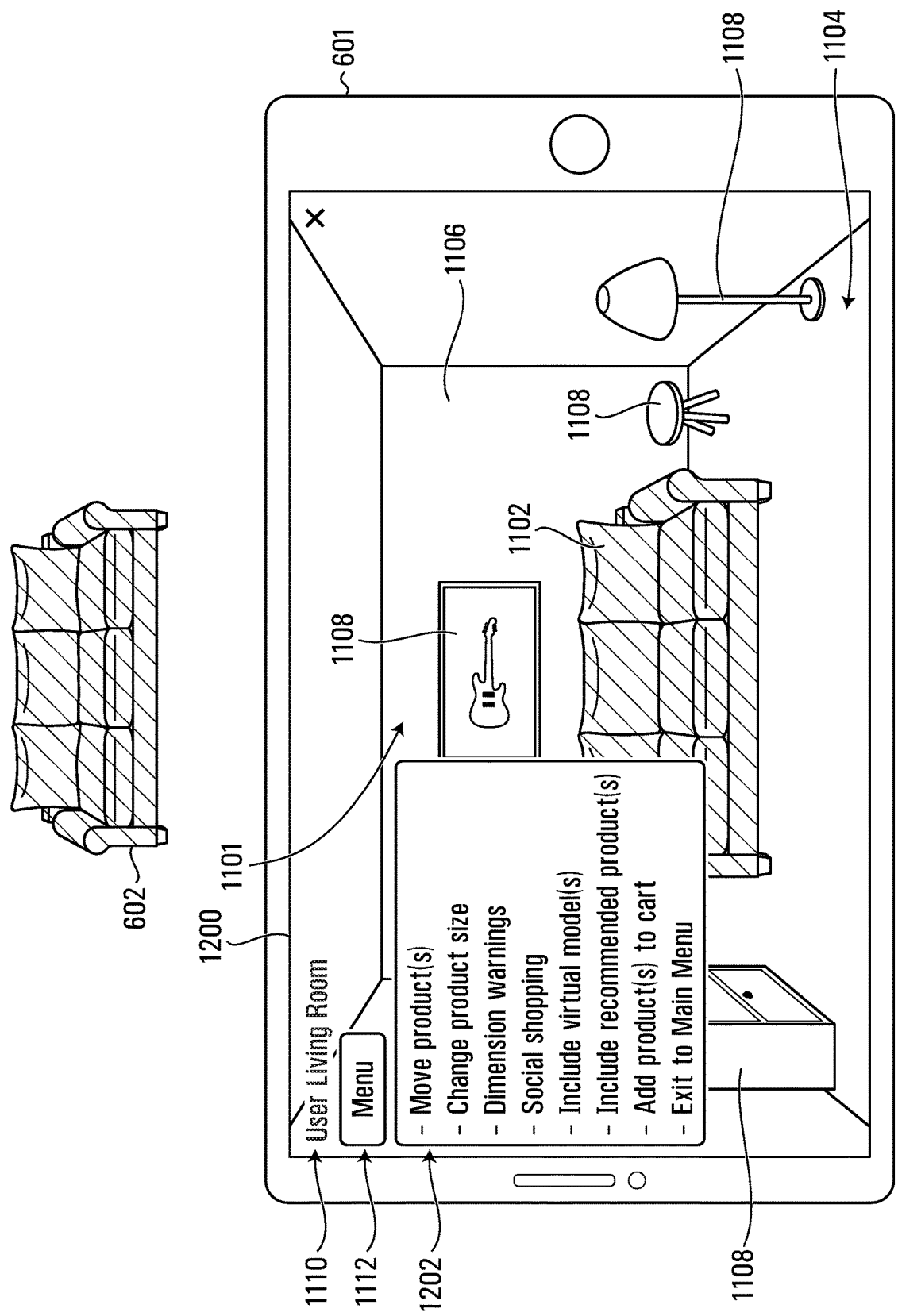

FIG. 12 is another diagram illustrating the AR scene 1101 displayed on the customer device 601, according to an embodiment. FIG. 12 includes a screen page 1200 showing a menu 1202 for the AR scene 1101. The customer could be directed to the screen page 1200 in response to selection of the option 1112.

The menu 1202 includes an option to move one or more product(s) within the AR scene 1101, an option to change a product's size, an option to view any dimension warnings, an option to initiate social shopping, an option to add one or more virtual model(s) to the AR scene 1101, an option to add one or more recommended product(s) to the AR scene 1101, an option to purchase a product (i.e., the couch 602) and an option to exit the AR scene 1101.

Figure 13:
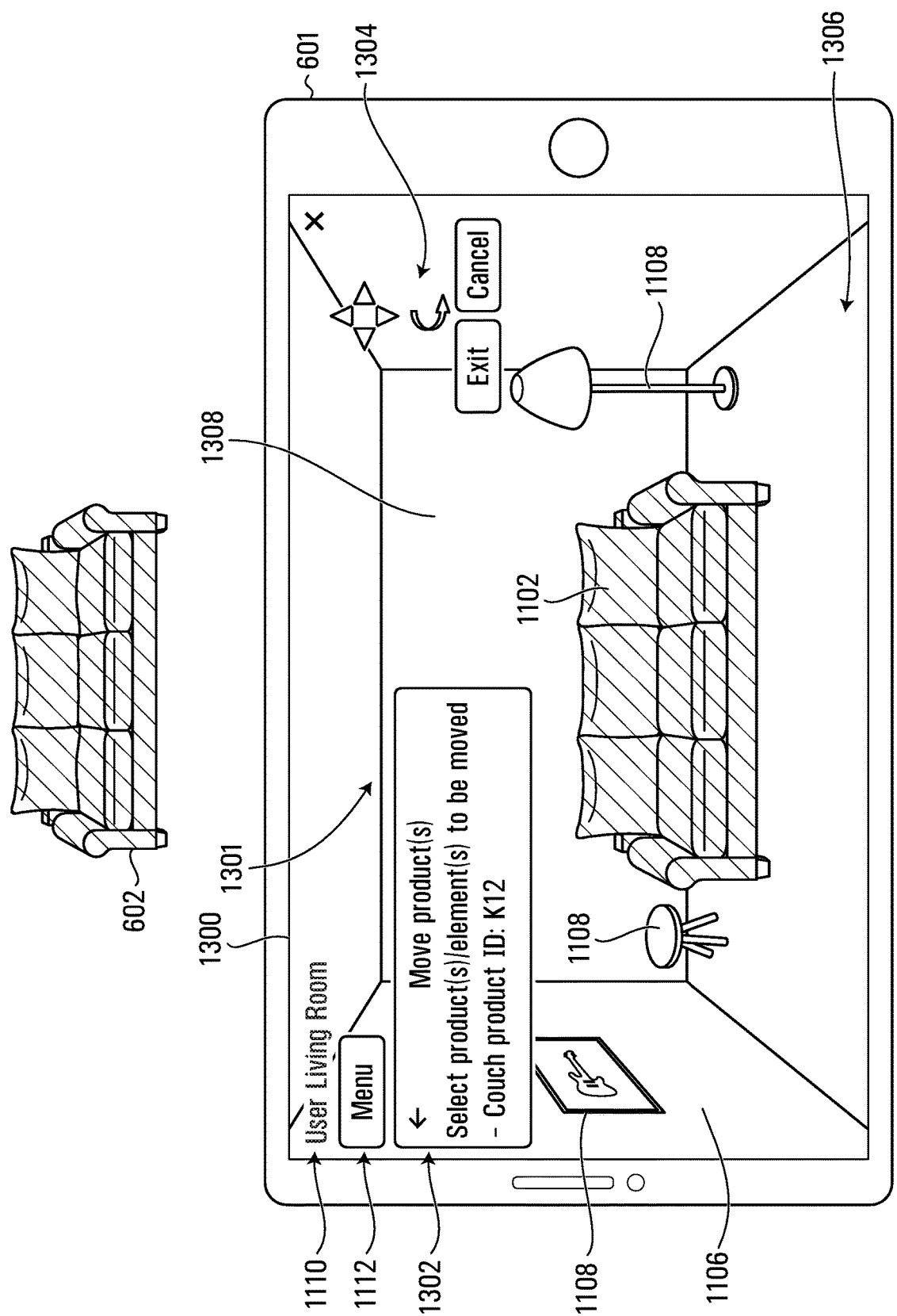
FIGS. 13 and 14 are diagrams illustrating modified AR scenes displayed on a customer device, according to some embodiments.

FIG. 13 is a diagram illustrating a modified AR scene 1301 displayed on the customer device 601, according to an embodiment. FIG. 13 includes a screen page 1300 with the modified AR scene 1301 and an option 1302 to move an item in the AR scene 1301. In the illustrated example, the only item that is available to be moved is the depiction 1102 of the couch 602. The screen page 1300 further includes multiple commands 1304 that enable the customer to move an item in the modified AR scene 1301. When the customer uses one or more of the commands 1304, a request to modify an AR scene is created and transmitted to the AR engine that produced the AR scene. In response to receiving the request, the AR engine generates a modified version of the AR scene, which is transmitted to the customer device 601 with an instruction to display the modified AR scene on the customer device 601. The screen page 1300 can be accessed using the option to move one or more product(s) provided in the menu 1202.

It should be noted that the commands 1304 are only one example of enabling a customer to move an item in an AR scene. In another example, a customer could move an item in an AR scene using gestures that are detected by a touch screen. An option to "move product" could be selected by the customer, which allows the user to move the anchor point and orientation of an item within the scene using the gestures.

To produce the modified AR scene 1301, the customer generated a request to move the depiction 1102 of the couch 602 from the wall 1106 to another wall 1308 of the living room using the commands 1304. In effect, this changed the anchor point and orientation of the depiction 1102 of the couch 602 in the computer-generated scenery 1104. The modified AR scene 1301 includes the depiction 1102 of the couch 602 and updated or modified computer-generated scenery 1306 compared to the computer generated scenery 1104. The computer-generated scenery 1306 is a 2D render, from the 3D model corresponding to the scene 902, which shows the customer's living room from a different angle. The computer-generated scenery 1306 is superimposed with the depiction 1102 of the couch 602 such that the depiction 1102 is shown against the wall 1308 of the living room, rather than the wall 1106 of the living room.

Figure 14:
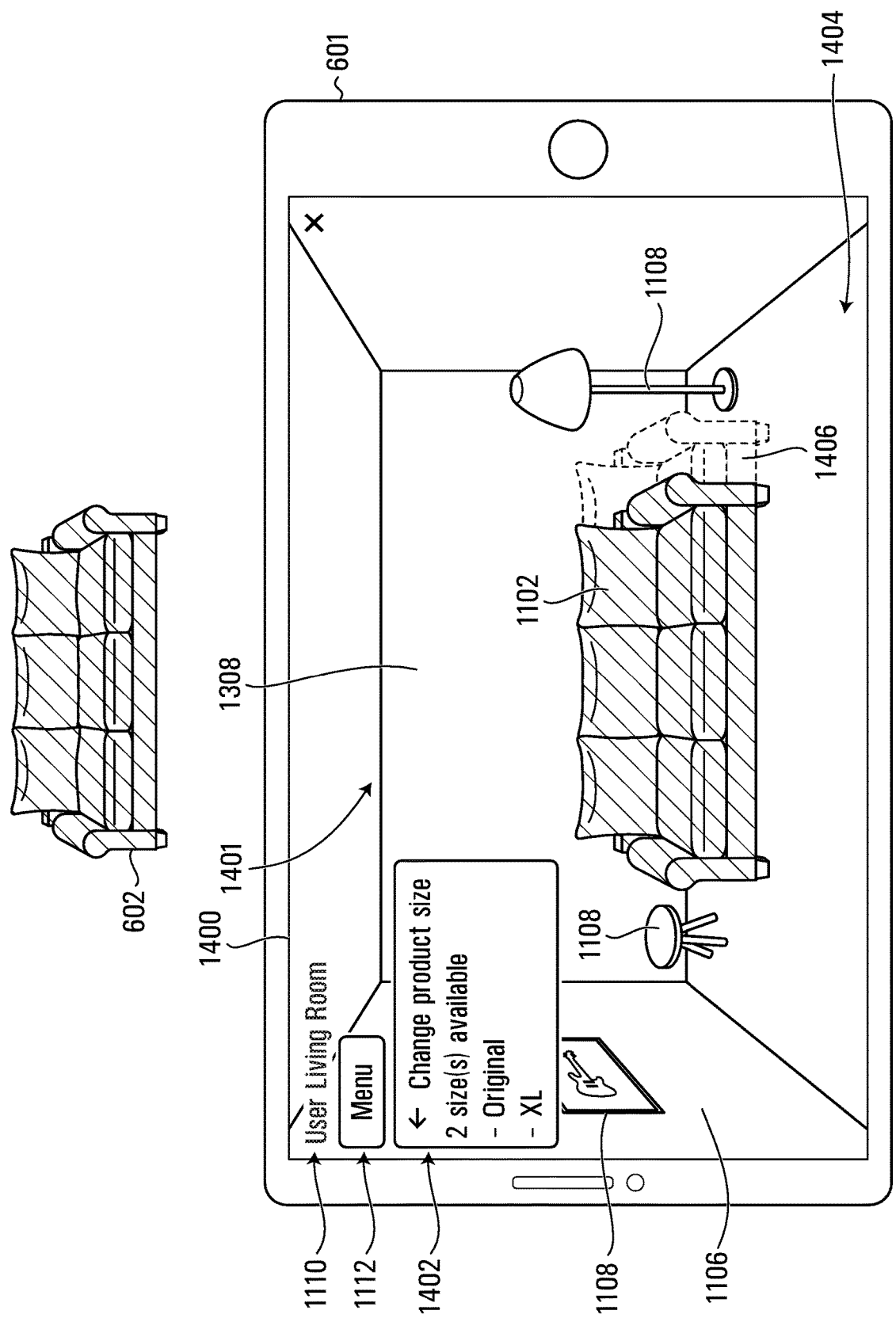

FIG. 14 is another diagram illustrating a modified AR scene 1401 displayed on the customer device 601, according to an embodiment. FIG. 14 includes a screen page 1400 with the AR scene 1401 and a menu 1402 to change the size of the depiction 1102 of the couch 602. The menu 1402 includes two size options for the couch 602: (i) the original size that corresponds to the actual size of the couch 602 that the customer is viewing, and (ii) an "XL" size that is not physically available for the customer to view in real-life. The menu 1402 could have been accessed using the option to change a product's size in the menu 1202, for example.

The AR scene 1401 is generated and displayed on the customer device 601 in response to the customer selecting the "XL" option in the menu 1402. The AR scene 1401 includes the depiction 1102 of the couch 602 and modified or updated computer-generated scenery 1404. The computer-generated scenery 1404 is similar to the computer-generated scenery 1306, but includes an indication 1406 of the dimensions (shown in dashed lines) of the "XL" size of the couch 602. The indication 1406 allows the customer to view and appreciate the scale of the "XL" size of the couch 602 in the customer's living room, even though that size is not physically available in the store.

In some embodiments, either or both of the screen pages 1300, 1400 are associated with requests to modify an AR scene received in step 514 of the method 500.

Figure 15:
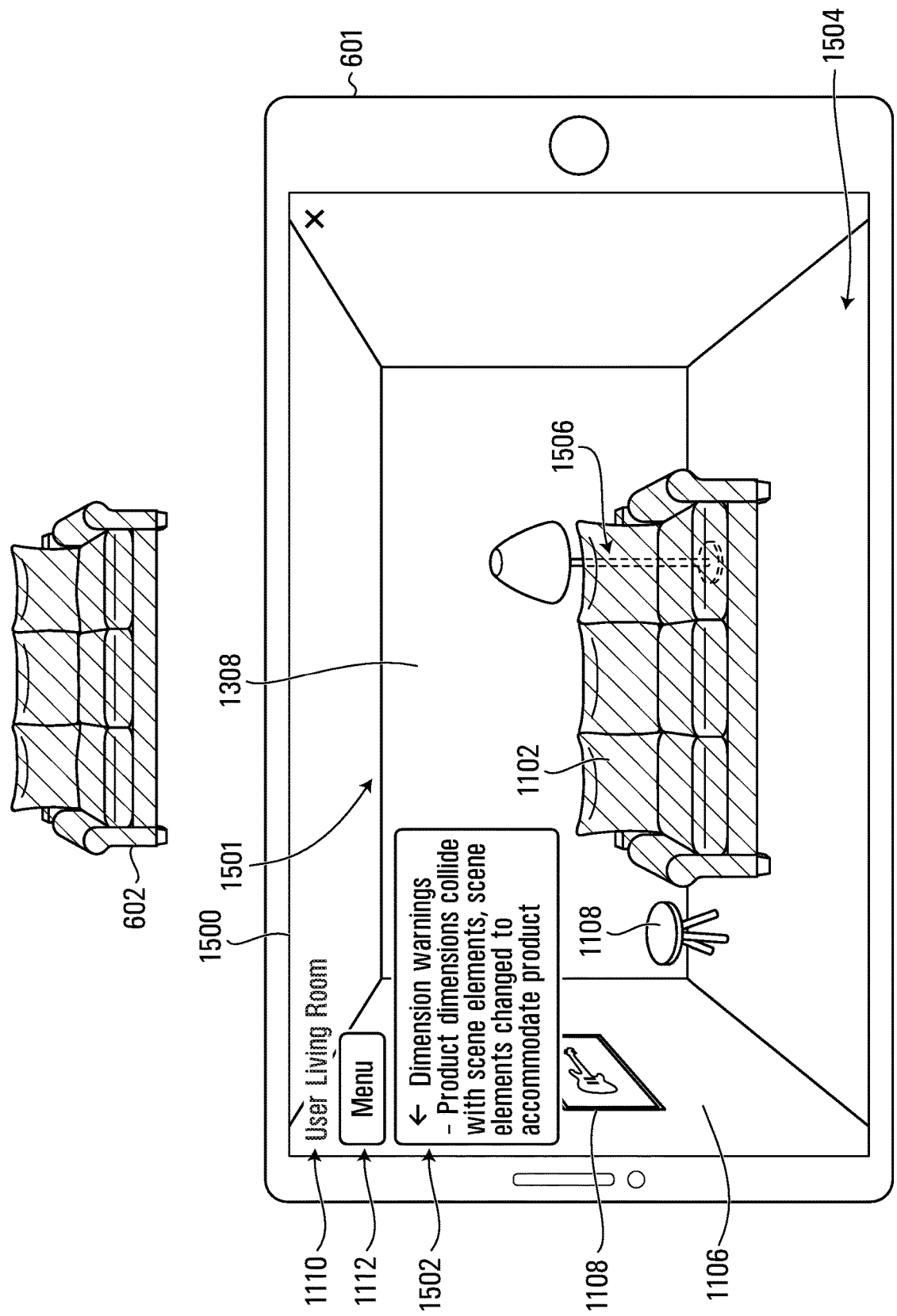
FIG. 15 is a diagram illustrating a collision in an AR scene, according to an embodiment.

In some cases, a virtual product or object in an AR scene may overlap in 2D or 3D space with an image of a physical item. This overlap is also referred to as a collision. FIG. 15 is a diagram illustrating a collision in an AR scene 1501, according to an embodiment. FIG. 15 includes a screen page 1500 showing the AR scene 1501. The AR scene 1501 includes the depiction 1102 of the couch 602 and computer-generated scenery 1504. The computer-generated scenery 1504 includes a virtual representation of a lamp 1506 that collides with the depiction 1102 of the couch 602. The portion of the lamp 1506 that collides with the depiction 1102 is shown in dashed lines so as not to obscure the depiction 1102. The screen page 1500 includes an indication 1502 of the collision in the AR scene 1501, which could have been accessed in response to the customer selecting the option to view a dimension warning in menu 1202, for example.

In response to a collision in an AR scene, a customer may take any of a number of different actions to rectify the collision. In some embodiments, the customer may modify the AR scene by moving the anchor point for a depiction of the physical item to a different location. The customer could also or instead select a different scene in which to present the physical item.

Figure 16:
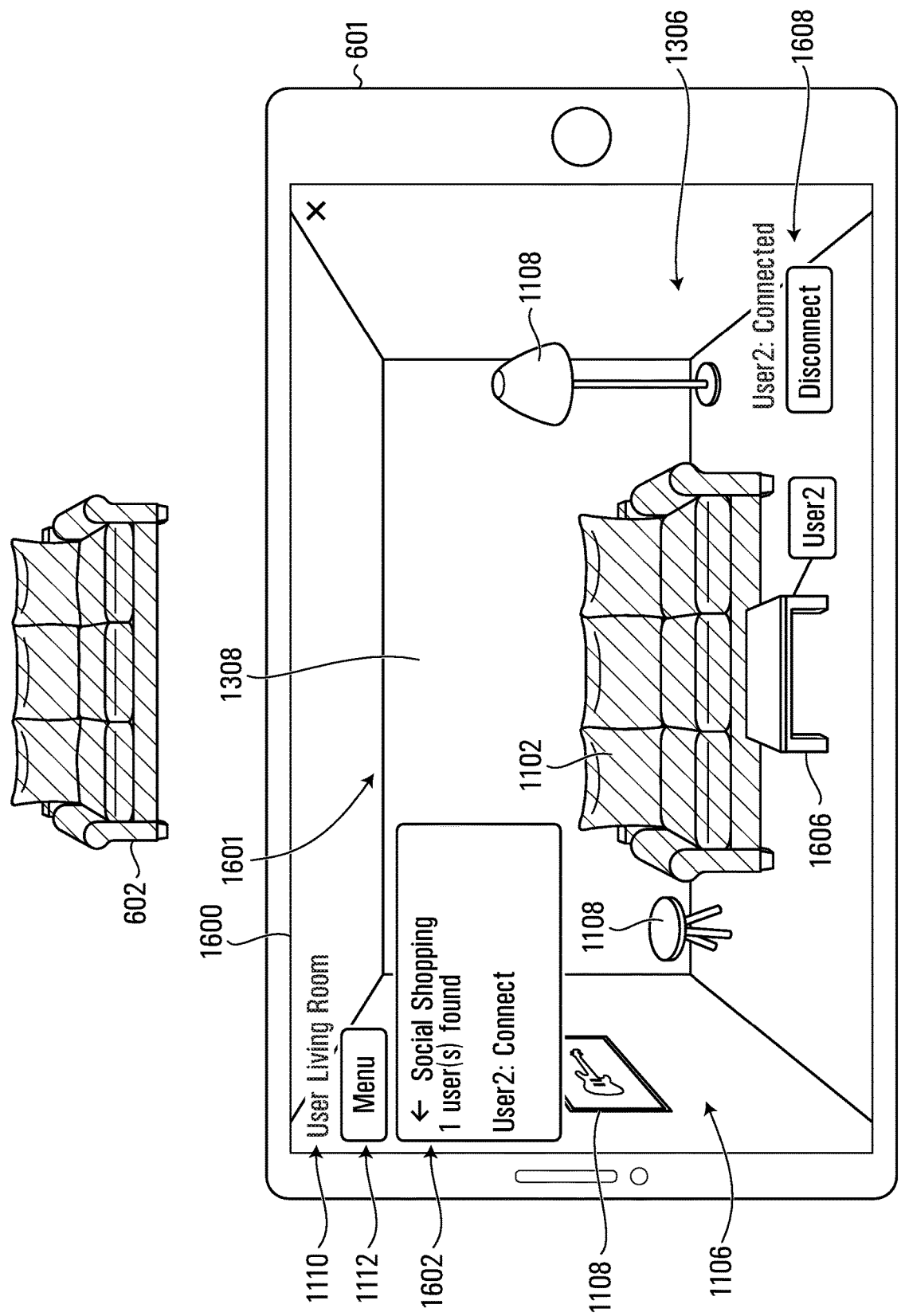
FIGS. 16 and 17 are diagrams illustrating modified AR scenes displayed on a customer device, according to other embodiments.

FIG. 16 is yet another diagram illustrating a modified AR scene 1601 displayed on the customer device 601, according to an embodiment. FIG. 16 includes a screen page 1600 with the AR scene 1601 and a menu 1602 to enable social shopping. In the illustrated example, the menu 1602 indicates that another user ("User2"), who may be a friend or family member of the customer, has been found. The customer has enabled social shopping with User2 through the menu 1602. In response, the screen page 1600 further includes an indication 1608 that the customer device 601 is connected to User2. The menu 1602 could have been accessed using the option to initiate social shopping in the menu 1202, for example.

The AR scene 1601 includes the depiction 1102 of the couch 602, a depiction 1606 of a physical real-world table, and the computer-generated scenery 1306. The depiction 1606 of the table is a virtual representation of the table that has been captured by a customer device associated with User2. The depiction 1606 of the table could have been generated using a 3D model of the table that is stored in memory or was generated by the customer device associated with User2. The AR scene 1601 allows the customer to view how the couch 602 and the table will look together in the customer's living room. A similar AR scene could also be displayed on the customer device associated with User2.

Figure 17:
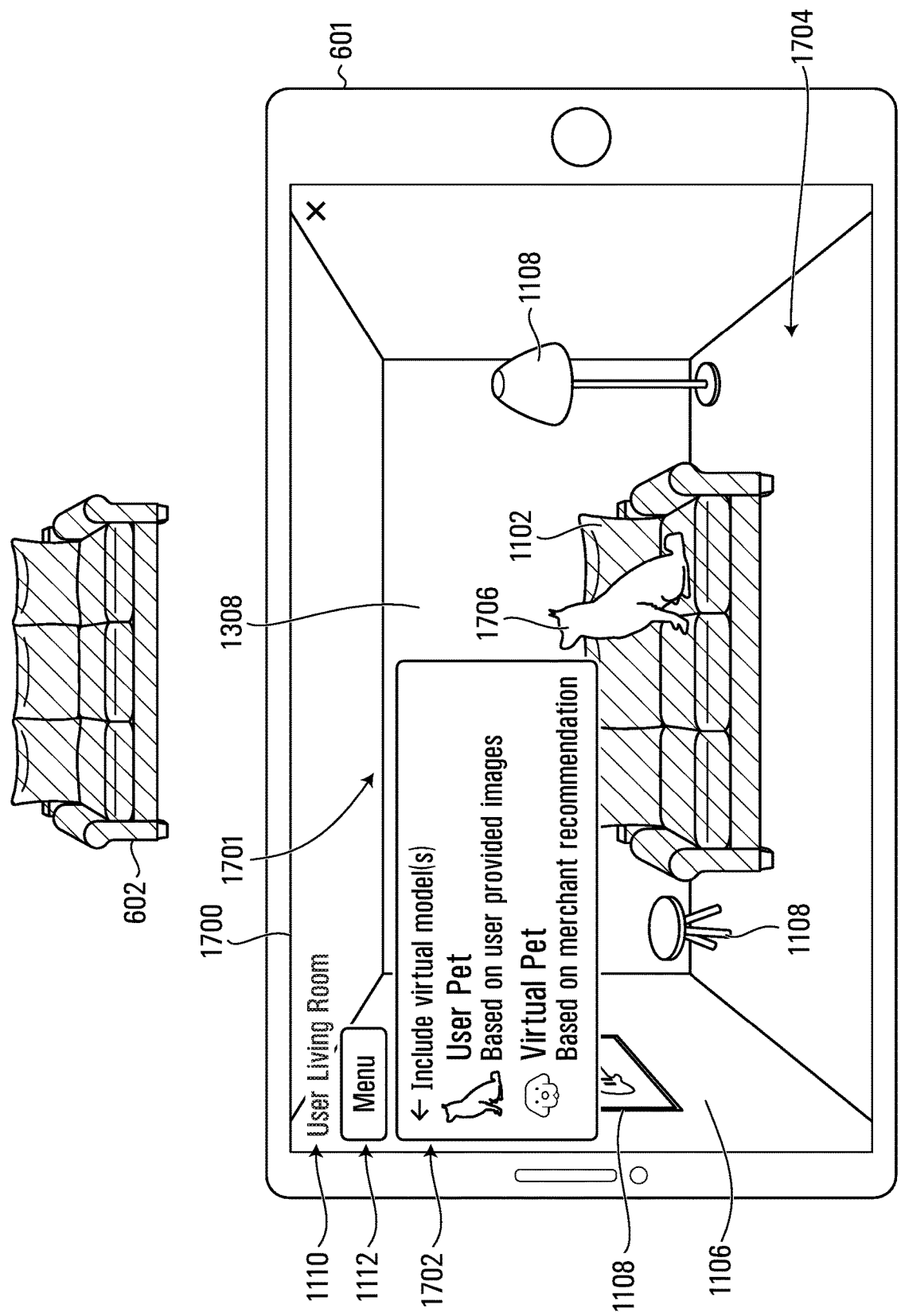

FIG. 17 is a further diagram illustrating a modified AR scene 1701 displayed on the customer device 601, according to an embodiment. FIG. 17 includes a screen page 1700 with the AR scene 1701 and a menu 1702 providing an option to include one or more virtual model(s) in the AR scene 1701. In the illustrated example, the menu 1702 indicates that two possible AR models are available, including a model of the customer's pet and a model of a virtual pet. In some implementations, the model of the customer's pet is stored in the customer data 410 in the AR engine 402, and the model of the virtual pet is a merchant recommended model that is stored in the product data 412 in the AR engine 402. Each of the virtual models corresponds to a respective 3D model. The menu 1702 could have been accessed using the option to include one or more virtual model(s) provided in the menu 1202, for example.

The AR scene 1701 includes the depiction 1102 of the couch 602 and computer-generated scenery 1704. The computer-generated scenery 1704 shows the customer's living room as well as a virtual representation 1706 of the customer's pet overlaid with the depiction 1102 of the couch 602. In this example, the customer's pet is shown sitting on the couch. The representation 1706 of the pet is scaled to the size of the couch 602 to allow the customer to appreciate the size of the couch 602 compared to their pet. The AR scene 1701 is generated and displayed on the customer device 601 in response to the customer selecting their pet in the menu 1702.

In some embodiments, the screen page 1700 is associated with a request to modify an AR scene received in step 514 of the method 500.

It should be noted that pets are only one example of virtual models that can be added to an AR scene. In general, a virtual model can include any person, animal or object that is associated with a customer and/or a product. For example, a parent may wish to buy an article of clothing for their child when the child is not present. An AR engine generates an AR scene that depicts the child wearing the article of clothing to allow the parent to appreciate the look and fit of the clothing. The depiction of the child may be a virtual model that can be selected from a menu such as the menu 1702.

Figure 18:
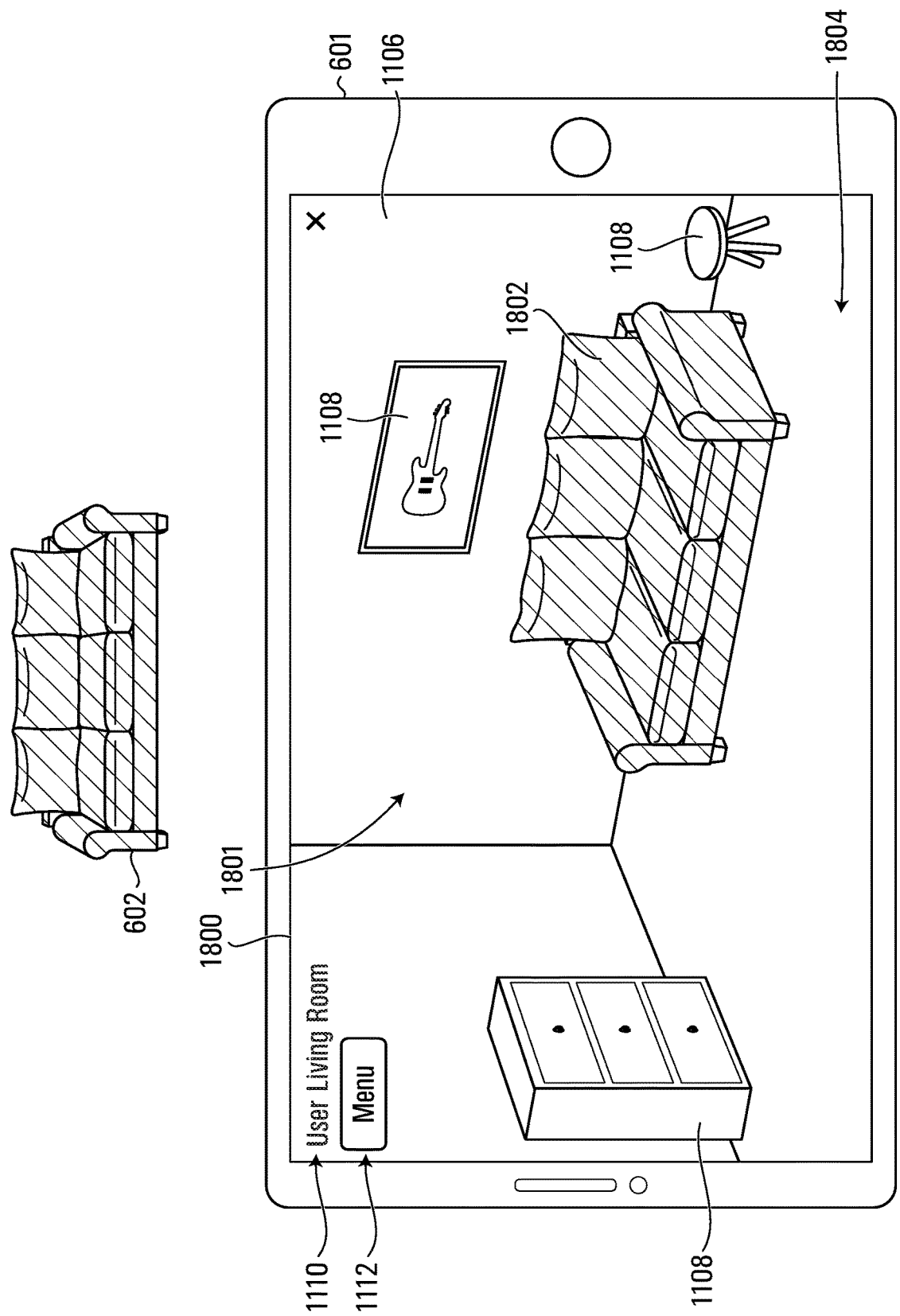
FIG. 18 is a diagram illustrating an AR scene displayed on a customer device after moving the customer device, according to an embodiment.

FIG. 18 is a diagram illustrating an AR scene 1801 displayed on the customer device 601 after moving the customer device 601, according to an embodiment. FIG. 18 includes a screen page 1800 with the AR scene 1801. The AR scene 1801 includes a depiction 1802 of the couch 602 and computer-generated scenery 1804. In this example, the customer device 601 is capturing an image of the couch 602 from a different angle than in FIG. 11. As such, the depiction 1802 of the couch 602 differs from the depiction 1102 shown in FIG. 11. For example, the customer holding the customer device 601 could have moved to a different position to view the couch 602 from a different perspective. Similar to AR scene 1101, the depiction 1802 is anchored to the wall 1106 in the customer's living room and oriented to face away from the wall 1106. The computer-generated scenery 1804 has been updated compared to the computer-generated scenery 1104 to maintain the anchor point of the depiction 1804 at the wall 1106. This is an example of tracking physical items in images and generating AR scene based on those images in real-time.

In some embodiments, the AR scene 1801 is generated in step 510 in the method 500.

Figure 19:
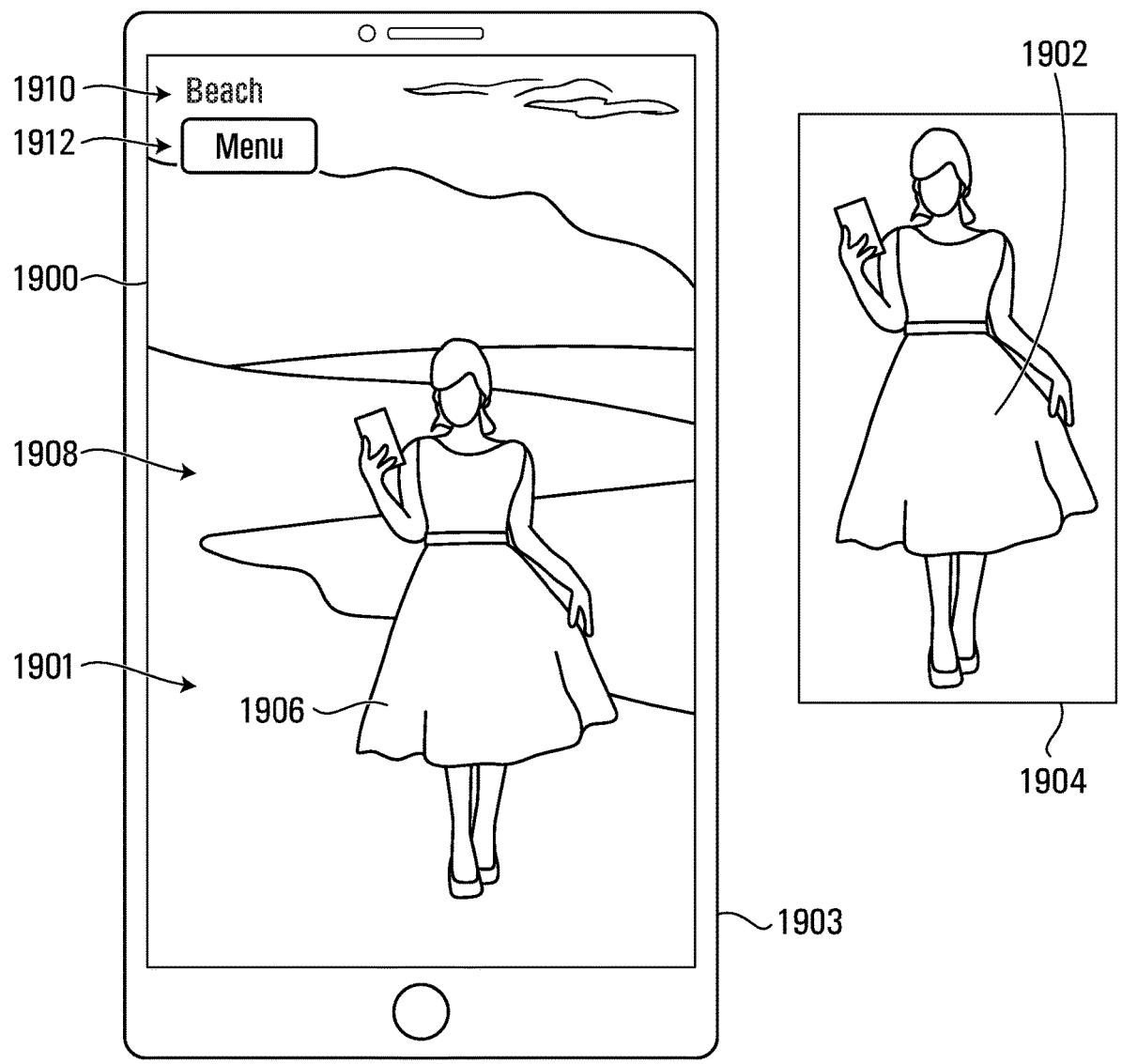
FIG. 19 is a diagram illustrating an AR scene displayed on a customer device, according to an embodiment.
Figure 20:
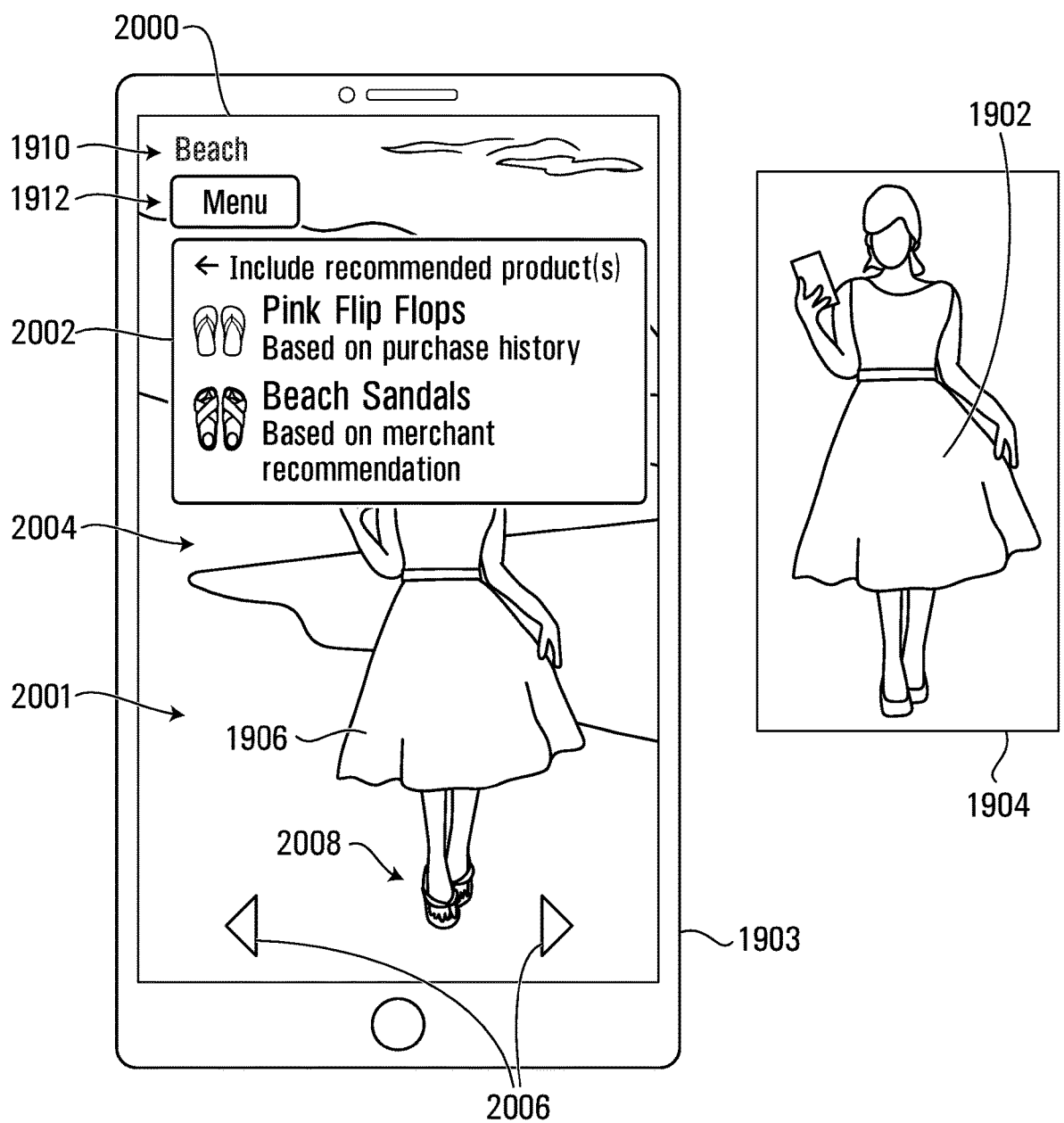
FIG. 20 is a diagram illustrating a modified AR scene displayed on a customer device, according to an embodiment.

Reference will now be made to FIGS. 19 and 20, which provide examples of generating an AR scene for a customer that is interested in buying a dress 1902. The dress 1902 is a physical item of a product that the customer is trying on a real-world store. The customer is viewing the dress using a mirror 1904. The customer is also capturing an image of the dress 1902 using a customer device 1903 associated with the customer.

FIG. 19 is a diagram illustrating an AR scene 1901 displayed on the customer device 1903, according to an embodiment. FIG. 19 includes a screen page 1900 showing the AR scene 1901. The AR scene 1901 includes a depiction 1906 of the customer wearing the dress 1902 and computer-generated scenery 1908. The depiction 1906 of the customer wearing the dress 1902 represents a portion of an image taken by the customer device 1903. In the illustrated example, the customer device 1903 is actively capturing the image of the customer wearing the dress 1902.

The computer-generated scenery 1908 depicts a beach scene. This beach scene could be based on 3D model of a location associated with the customer or a location associated with the dress. By way of example, the dress 1902 could be a dress that is intended to be worn at the beach. The AR scene 1901 allows the customer to appreciate how they will look in the dress in a beach setting. In some implementations, the AR scene 1901 further includes audio for the beach scene, such as the sounds of waves.

The screen page 1900 further includes an indication 1910 that the AR scene 1901 corresponds to the beach and an option 1912 to access a menu for the AR scene 1901. This menu could be similar to the menu 1202 shown in FIG. 12, for example.

FIG. 20 is a diagram illustrating a modified AR scene 2001 displayed on the customer device 1903, according to an embodiment. FIG. 20 includes a screen page 2000 with the AR scene 2001 and a menu 2002 to select a product to be added to the AR scene 2001. The menu 2002 could have been accessed through the option 1912, for example. In the illustrated example, pink flip flops and beach sandals are products that are available in the menu 2002. The pink flip flops are a product that has been previously purchased by the customer, and are therefore associated with the customer. The pink flip flops are also associated with the beach, as they might be intended to be worn at the beach. The beach sandals are a product that is recommended by the merchant for the dress 1902. For example, the beach sandals and dress 1902 might both be intended to be worn at the beach, and have complimentary features and/or colors.

The AR scene 2001 includes the depiction 1906 of the customer wearing the dress 1902 and updated or modified computer-generated scenery 2004. The computer-generated scenery 2004 includes the same beach scene as the computer-generated scenery 1908, and also includes a virtual representation 2008 of the pink flip flops purchased by the merchant. Therefore, AR scene 2001 allows the customer to view a representation of the customer wearing the dress 1902 at the beach in their pink flip flops. The AR scene 2001 may have been generated in response to the customer selecting the pink flip flops in the menu 2002, which is an example of a request to modify an AR scene.

The screen page 2000 further includes multiple commands 2006 that enable the customer to switch between the recommended products in the menu 2002. In some implementations, the mirror 1904 implements a gesture recognition system that allows the user to switch between recommended products using gestures.

Although the screen pages 600, 700, 800, 900, 1000, 1100, 1200, 1300, 1400, 1500, 1600, 1700, 1800, 1900, 2000 are all being displayed on a customer device in the form of a handheld device such as a cell phone, this is only an example. Any or all of the screen pages 600, 700, 800, 900, 1000, 1100, 1200, 1300, 1400, 1500, 1600, 1700, 1800, 1900, 2000 could instead be displayed on any other example of a customer device described herein. For example, the mirror 1904 of FIGS. 19 and 20 could instead be a smart mirror that captures and image of the customer and displays the AR scenes 1901, 2001.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A computer-implemented method comprising:
obtaining an image of a physical real-world product for sale, the image having been captured by a device associated with a user;
determining an identity of the physical real-world product;
obtaining an indication of a plurality of different virtual scenes in which to present the physical real-world product using augmented reality (AR), at least two of the virtual scenes each of a respective different room in which the physical real-world product may be presented, each different virtual scene associated with a respective different three-dimensional (3D) model, each for generating respective different virtual content, and each associated with at least one of the user and the physical real-world product, and wherein at least one of the virtual scenes is recommended based on the identity of the physical real-world product;
instructing the device to display the indication of the plurality of different virtual scenes;
receiving a selection of a particular virtual scene associated with a particular 3D model of the plurality of different 3D models;
generating an AR scene comprising both: (1) computer-generated scenery including the virtual content of the particular virtual scene associated with the particular 3D model that was selected and (2) at least a portion of the image of the physical real-world product; and
instructing the device to display the AR scene.

2. The computer-implemented method of claim 1, wherein:
the physical real-world product is a first product,
the method further comprises obtaining an indication of a second product associated with at least one of the user and the first product, and the computer-generated scenery comprises a virtual representation of the second product.

3. The computer-implemented method of claim 1, wherein determining the identity of the physical real-world product comprises receiving an indication of the physical real-world product.

4. The computer-implemented method of claim 1, wherein determining the identity of the physical real-world product comprises analysing the image.

5. The computer-implemented method of claim 1, wherein generating the AR scene comprises:
determining the dimensions of the physical real-world product, and
scaling the computer-generated scenery relative to the dimensions of the physical real-world product.

6. The computer-implemented method of claim 1, wherein generating the AR scene comprises anchoring the portion of the image to a virtual point in the computer-generated scenery.

7. The computer-implemented method of claim 1, further comprising:
receiving a request to modify the AR scene;
generating a modified AR scene based on the request; and
instructing the device to display the modified AR scene.

8. The computer-implemented method of claim 1, wherein the image is a first image, the physical real-world product is a first physical item, the device is a first device and the user is a first user, the method further comprising:
obtaining a second image of a second physical item, the second image having been captured by a second device associated with a second user, wherein the AR scene further comprises a virtual representation of the second physical item.

9. The computer-implemented method of claim 1, wherein the indication of the plurality of different virtual scenes is obtained using a machine learning model.

10. The computer-implemented method of claim 1, wherein generating the AR scene comprises generating the visual content and one or more of audio content and haptic content.

11. The computer-implemented method of claim 1, further comprising recommending the at least one of the virtual scenes based on both the identity of the physical real-world product and information associated with the user.

12. The computer-implemented method of claim 1, wherein the plurality of different virtual scenes are each recommended based on the identity of the physical real-world product.

13. The computer-implemented method of claim 1, wherein the at least one of the virtual scenes is recommended based on product information corresponding to the identity of the physical real-world product.

14. A system comprising:
a memory to store an image of a physical real-world product for sale, the image having been captured by a device associated with a user;
at least one processor to:
determine an identity of the physical real-world product;
obtain an indication of a plurality of different virtual scenes in which to present the physical real-world product using augmented reality (AR), at least two of the virtual scenes each of a respective different room in which the physical real-world product may be presented, each different virtual scene associated with a respective different three-dimensional (3D) model, each for generating respective different virtual content, and each associated with at least one of the user and the physical real-world product, and wherein at least one of the virtual scenes is recommended based on the identity of the physical real-world product;

instruct the device to display the indication of the plurality of different virtual scenes;

receive a selection of a particular virtual scene associated with a particular 3D model of the plurality of different 3D models;

generate an AR scene comprising both: (1) computer-generated scenery including the virtual content of the particular virtual scene associated with the particular 3D model that was selected and (2) at least a portion of the image of the physical real-world product; and instruct the device to display the AR scene.

15. The system of claim 14, wherein:
the physical real-world product is a first product,
the at least one processor is to obtain an indication of a second product associated with at least one of the user and the first product, and
the computer-generated scenery comprises a virtual representation of the second product.

16. The system of claim 14, wherein the at least one processor is further to:
determine the dimensions of the physical real-world product, and
scale the computer-generated scenery relative to the dimensions of the physical real-world product.

17. The system of claim 14, wherein the at least one processor is further to anchor the portion of the image to a virtual point in the computer-generated scenery.

18. The system of claim 14, wherein the at least one processor is further to:
receive a request to modify the AR scene;
generate a modified AR scene based on the request; and
instruct the device to display the modified AR scene.

19. The system of claim 14, wherein the image is a first image, the physical real-world product is a first physical item, the device is a first device, the user is a first user, and the memory is further to:
store a second image of a second physical item, the second image having been captured by a second device associated with a second user, wherein the AR scene further comprises a virtual representation of the second physical item.

20. The system of claim 14, wherein the indication of the plurality of different virtual scenes is obtained using a machine learning model.

21. The system of claim 14, wherein the AR scene comprises the visual content and one or more of audio content and haptic content.

22. The system of claim 14, wherein the at least one processor is to recommend the at least one of the virtual scenes based on both the identity of the physical real-world product and information associated with the user.

23. The system of claim 14, wherein the plurality of different virtual scenes are each recommended based on the identity of the physical real-world product.

24. The system of claim 14, wherein the at least one of the virtual scenes is recommended based on product information corresponding to the identity of the physical real-world product.

* * * * *